US011595846B2

United States Patent
Folke

(10) Patent No.: US 11,595,846 B2
(45) Date of Patent: Feb. 28, 2023

(54) APPARATUSES AND METHODS FOR HANDLING DATA PACKETS

(71) Applicant: Telefonaktiebolaget LM Ericsson (publ), Stockholm (SE)

(72) Inventor: Mats Folke, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 191 days.

(21) Appl. No.: 17/048,643

(22) PCT Filed: Apr. 19, 2018

(86) PCT No.: PCT/SE2018/050398
§ 371 (c)(1),
(2) Date: Oct. 19, 2020

(87) PCT Pub. No.: WO2019/203703
PCT Pub. Date: Oct. 24, 2019

(65) Prior Publication Data
US 2021/0243645 A1    Aug. 5, 2021

(51) Int. Cl.
*H04W 28/06* (2009.01)
*H04L 47/36* (2022.01)
*H04L 69/22* (2022.01)

(52) U.S. Cl.
CPC ............. *H04W 28/06* (2013.01); *H04L 47/36* (2013.01); *H04L 69/22* (2013.01)

(58) Field of Classification Search
CPC ...... H04W 28/06; H04W 80/02; H04L 47/36; H04L 69/22; H04L 69/324
See application file for complete search history.

(56) References Cited

U.S. PATENT DOCUMENTS

| 9,756,680 B2 * | 9/2017 | Wang ............... H04W 80/02 |
| 2002/0027919 A1 | 3/2002 | Eneroth et al. |
| 2008/0123620 A1 | 5/2008 | Ko et al. |

(Continued)

FOREIGN PATENT DOCUMENTS

| EP | 3 162 038 | 5/2017 |
| WO | 2016/064221 A1 | 4/2016 |

OTHER PUBLICATIONS

International Search Report and Written Opinion issued in International Application No. PCT/SE2018/050398 dated Jan. 29, 2019 (15 pages).

(Continued)

*Primary Examiner* — Kibrom T Hailu
(74) *Attorney, Agent, or Firm* — Rothwell, Figg, Ernst & Manbeck, P.C.

(57) ABSTRACT

The present disclosure relates to radio network communication. In one of its aspects, the disclosure presented herein concerns a method for assigning a value representing a length of a data packet to a field. The method is implemented in an apparatus. According to the method, a size of the data packet is determined. Based on the determined size of the data packet, the size of the field is set. The determined size of the data packet is then compared against a value threshold, and based on the comparison and based on the determined size of the data packet, a value representing the length of the data packet is calculated. The calculated value representing the length of the data packet is then assigned to the field.

20 Claims, 15 Drawing Sheets

(56) References Cited

U.S. PATENT DOCUMENTS

2016/0205587 A1     7/2016   Yu et al.
2021/0376986 A1*   12/2021   Agiwal ................ H04W 28/06

OTHER PUBLICATIONS

Motorola et al., "Radio Link Control (RLC) header compression for Long Term Evolution (LTE)", IP.com, May 22, 2010 (6 pages).

Huawei et al., "Support for super jumbo frame in NR", 3GPP TSG-RAN WG2 Meeting #98, R2-1704617, Hangzhou, China, May 15-29, 2017 (2 pages).

* cited by examiner

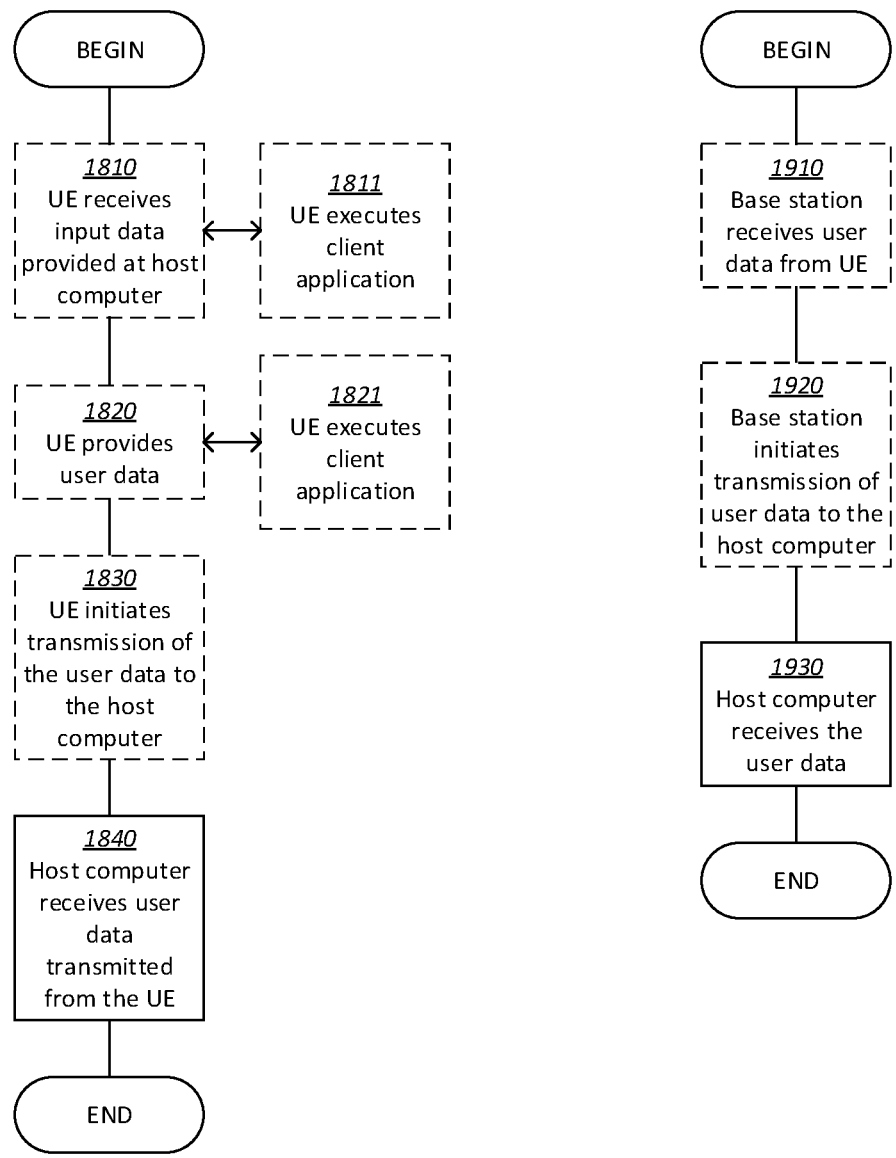

APPARATUSES AND METHODS FOR HANDLING DATA PACKETS

CROSS REFERENCE TO RELATED APPLICATION(S)

This application is a 35 U.S.C. § 371 National Stage of International Patent Application No. PCT/SE2018/050398, filed Apr. 19, 2018, designating the United States.

TECHNICAL FIELD

The present disclosure generally relates to telecommunications. In particular, the various embodiments described in this disclosure relates to apparatuses and methods for handling data packets.

BACKGROUND

This section is intended to provide a background to the various embodiments of the invention that are described in this disclosure. Therefore, unless otherwise indicated herein, what is described in this section should not be interpreted to be prior art by its mere inclusion in this section.

Generally, a data packet is a unit of data made into a single package that is transmitted along a given network path. In telecommunications, a Protocol Data Unit (PDU) is information that is transmitted as a single unit among peer entities of a network. The PDU typically consists of a header part and a data part. The header part comprises different fields of control information. A receiver of the PDU may use the control information to interpret the data part of the PDU. The size of the header part may be fixed or varying and the size of the data part is typically varying.

A Media Access Control (MAC) PDU is a message that is exchanged between MAC entities in a communication system based on the layered Open Systems Interconnection model (OSI). A MAC PDU is a bit string that is byte aligned, i.e. multiple of 8 bits, in length, as illustrated in FIG. 1. FIG. 1 illustrates an example of a New Radio (NR) MAC PDU. A MAC PDU header comprises one or more MAC PDU subheaders, wherein each subheader corresponds to either a MAC SDU, a MAC Control Element (CE) or padding. The MAC SDU comprises, through encapsulation of the other protocols, an IP packet, see FIG. 2. FIG. 2 illustrates a simplified picture of this as the IP packet can be segmented.

As previously described, the header of the PDU comprises different fields of control information. A NR MAC subheader, except for fixed sized MAC CE and padding, comprises four header fields; the R field, the F field, the LCID-field and the L field. The R field is a reserved bit and the F field is a format field indicating the size of a length field. The LCID field is a Logical Channel ID Field that identifies the logical channel instance of the corresponding MAC SDU or the type of the corresponding MAC CE or padding, and the L field is a length field that indicates the length of the corresponding MAC SDU or variable-sized MAC CE in bytes.

The L field generally describes the size of the data if the size of the header is fixed, or alternatively describes the size of the PDU if the size of the header is varying. Combinations of these two alternatives are also possible. There is one L field per MAC PDU subheader, except for the last subheader and subheaders corresponding to fixed-sized MAC CE which only comprises two header fields; R/LCID. A receiver of the PDU may use the length of the PDU for various reasons, for example, i) to determine when the parsing or decoding of the PDU is completed, ii) to determine where one PDU ends and the next one begins, and/or iii) to determine how much memory space to allocate for an incoming packet.

The size of the length field sets a limit to the maximum size of the PDU. Typically, the maximum size of a PDU is $2^n-1$, wherein n is the size of the length field in bits. A length field can have a varying size. In Long Term Evolution (LTE) MAC, the sizes of the L fields are typically 7 or 15 bits. The size of the L field is indicated by the F field and the F2 field. The size of the F field is 1 bit. If the size of the PDU is equal to, or less than, 127 bytes, the length field is 7 bits and the value of the F field is set to 0. If the size of the PDU is larger, the size of the length field is 15 bits and the F field is then set to 1. Accordingly, when the L field is 7 bits, 1 byte of the total size of the PDU is saved. In NR MAC, there are two sizes of the length field, 8 and 16 bits, but the principle from LTE is the same. FIG. 3a illustrates an R/F/LCID/L MAC subheader with 8-bit L field and FIG. 3b illustrates an R/F/LCID/L MAC subheader with 16-bit L field. An important difference in NR compared to LTE is that each IP packet gets its own Packet Data Convergence Protocol, PDCP, and Radio Link Control, RLC, header before being passed to MAC.

A more detailed description about MAC PDUs may be found in $3^{rd}$ *Generation Partnership Project* (3*GPP*), *Technical Specification* (*TS*) 36.321, chapter 6, and 3*GPP TS* 38.321, chapter 6.

SUMMARY

It is in view of the above background and other considerations that the various embodiments of the present disclosure have been made.

For PDUs of sizes larger than 255 (NR MAC), the size of the length field will be 16 bits. However, when the size of the length field is 16 bits, the first 255 values of the L field cannot generally be used. Values of this size, 1-255, indicate that the PDU is smaller than 256 bytes and thus, that the size of the length field should be 8 bits. The inventor has realized that these first 255 values, or code points, of the length field accordingly are unused for L fields of larger sizes. If these unused values could be used, the handling of data packets could be improved.

The theoretical maximum IP packet size in NR is 65535 ($2^{16}-1$) bytes, when the header includes a 16 bits L field. The inventor has realized that there is a problem of how to handle an IP packet with a maximum IP size, with a 16-bit length field in the IP packet, as the MAC SDU cannot generally fit the maximum size IP packet. The maximum size of an IP packet that NR can handle is 65535 ($2^{16}-1$, which is the maximum size of the MAC SDU or Radio Link Control, RLC, PDU) minus the header sizes of RLC and PDCP respectively, as each IP packet in NR gets its own PDCP and RLC header before being passed to MAC. Accordingly, the maximum sized IP packet with protocol headers will typically create a MAC SDU that is larger than 65535 bytes due to the added header size of PDCP and RLC. Traditionally, bigger sizes than 65535 bytes would require an L field that needs to be longer than 16 bits. However, a bigger length field than 16 bits, e.g. 20 bits, would increase the size of the MAC SDU subheader with one byte, which is not always desirable.

In view of the above, it is therefore a general object of the aspects and embodiments described throughout this disclosure to provide a solution for using unused values, or code points, in order to increase the maximum data packet size without unnecessarily increasing the size of a field describing the data packet.

This general object has been addressed by the appended independent claims. Advantageous embodiments are defined in the appended dependent claims.

According to a first aspect, there is provided a method for assigning a value representing a length of a data packet to a field.

A size of the data packet is determined and a size of the field is set based on the determined size of the data packet. The determined size of the data packet is compared against a value threshold. A value representing the length of the data packet is calculated based on the comparison and based on the determined size of the data packet. The calculated value representing the length of the data packet is assigned to the field.

In one embodiment, the size of the field is set to a first size if the determined size of the data packet is below or equal to a field threshold and else, set to a second size, if the determined size of the data packet is above said field threshold. The second size is different from the first size.

In one embodiment, if the determined size of the data packet is below or equal to a first value threshold, the value representing the length of the data packet is calculated to be an actual value of the determined size of the data packet; and the calculated value representing the length of the data packet is assigned to the field. Else, if the determined size of the data packet is above said first value threshold, the value representing the length of the data packet is calculated based on the determined size of the data packet; and the calculated value is assigned to the field.

In one embodiment, calculating the value representing the length of the data packet may comprise determining an offset value based on the determined size of the data packet; and subtracting the determined offset value from an actual value of said determined size of the data packet.

In one embodiment the first value threshold is equal to a formula $2^{\wedge}$(the first size of the field)$-1$ and the offset value is equal to a formula $2^{\wedge}$(the first size of the field). In another embodiment, the first value threshold is equal to a formula $2^{\wedge}$(the second size of the field)$-1$ and the offset value is equal to a formula $2^{\wedge}$(the second size of the field).

In one embodiment, when the determined size of the data packet is above a second value threshold, which is larger than the first value threshold, the determined size of the data packet is compared against a third value threshold. If the determined size of the data packet is below or equal to the third value threshold, the value representing the length of the data packet is calculated to be an actual value of the determined size of the data packet; and the calculated value representing the length of the data packet is assigned to the field. Else, if the determined size of the data packet is above the third value threshold the value representing the length of the data packet is calculated based on the determined size of the data packet and the calculated value is assigned to the field.

In one embodiment, the data packet is a Media Access Control (MAC) Service Data Unit (SDU) and the field is an L-field. The L-field may be located in a header in a Protocol Data Unit (PDU) carrying the MAC SDU.

In one exemplary embodiment, the method comprises determining the size of the MAC SDU and setting the size of the MAC SDU L-field based on the determined size of the MAC SDU. The MAC SDU is then compared against a first value threshold. If the determined size of the MAC SDU is below or equal to the first value threshold, the value representing the length of the MAC SDU is calculated to be the actual value of the determined size of the MAC SDU and the calculated value is assigned to the MAC SDU L-field. Else, if the determined size of the MAC SDU is above said first value threshold, the value representing the length of the MAC SDU is calculated by determining an offset value based on the determined size of the MAC SDU and subtracting the offset value from the actual value of said determined size of the MAC SDU. The calculated value is thereafter assigned to the MAC SDU L-field.

In one embodiment, the method further comprises transmitting the data packet to a receiving apparatus.

According to a second aspect, there is provided an apparatus for implementing the method according to the first aspect.

In one exemplary implementation, the apparatus comprises a processing circuitry and a memory circuitry. The memory circuitry stores computer program code which, when run in the processing circuitry, causes the apparatus to assign a value representing a length of a data packet to a field. The computer program code, when run in the processing circuitry, causes the apparatus to determine a size of the data packet and to set a size of the field based on the determined size of the data packet. The apparatus is caused to compare the determined size of the data packet against a value threshold and to calculate a value representing the length of the data packet based on the determined size of the data packet. The computer program code, when run in the processing circuitry, causes the apparatus to assign the calculated value representing the length of the data packet to the field.

In one embodiment, the apparatus further comprises a transmitting circuitry and the memory circuitry stores computer program code which, when run in the processing circuitry, causes the apparatus to transmit the data packet to a receiving apparatus. The apparatus may for example be a transmitter.

According to a third aspect, there is provided an apparatus. The apparatus comprises means adapted to assign a value representing the length of a data packet to a field. The apparatus further comprises means adapted to determine a size of the data packet, and means adapted to set a size of the field based on the determined size of the data packet. The apparatus further comprises means adapted to compare the determined size of the data packet against a value threshold; means adapted to calculate a value representing the length of the data packet based on the determined size of the data packet; and means adapted to assign the calculated value representing the length of the data packet to the field.

According to a fourth aspect, there is provided an apparatus. The apparatus comprises a first module configured to determine a size of the data packet, and a second module configured to set a size of the field based on the determined size of the data packet. The apparatus further comprises a third module configured to compare the determined size of the data packet against a value threshold, a fourth module configure to calculate a value representing the length of the data packet based on the determined size of the data packet, and a fifth module configured to assign the calculated value representing the length of the data packet to the field.

According to a fifth aspect, there is provided a method for handling a data packet and wherein a field is assigned a value representing a length of said data packet.

The value representing the length of the data packet is obtained and a size of the field is determined. An actual size of the data packet is established based on the determined size of the field and the obtained value representing the length of said data packet.

In one embodiment, if the determined size of the field is equal to a first size, the actual size of the data packet is established to be the value assigned to the field. Else, if the determined size of the field is equal to a second size, which is different from the first size, the actual size of the data packet is established based on the determined size of the field and the obtained value representing the length of said data packet.

In one embodiment, establishing the actual size of said data packet comprises determining an offset value based on the determined size of the field and adding the determined offset value to the obtained value representing the length of said data packet.

In one embodiment, determining the offset value comprises determining whether the first bits of the field are equal to zero or not. The first bits are represented by a formula the second size minus the first size. If the first bits of the field are not equal to zero, the determined offset value is equal to zero. Else, if the first bits of the field are equal to zero, the determined offset value is equal to a formula $2^{\wedge}$(the second size of the field). In another embodiment, the determined offset value is equal to a formula $2^{\wedge}$(the first size of the field).

In one embodiment, the data packet is a Media Access Control (MAC) Service Data Unit (SDU) and the field is an L-field. The L-field may be located in a header in a Protocol Data Unit (PDU) carrying the MAC SDU.

In one exemplary embodiment, the method comprises obtaining the value representing a length of the MAC SDU and determining the size of the MAC SDU L-field. If the determined size of the MAC SDU L-field is equal to a first size, the actual size of the MAC SDU is established to be the value assigned to the MAC SDU L-field. Else, if the determined size of the MAC SDU L-field is equal to a second size, which is different from the first size, the actual size of the MAC SDU is established by determining the offset value based on the determined size of the MAC SDU L-field and adding the determined offset value to the obtained value representing the length of said MAC SDU.

In one embodiment, the method further comprises receiving the data packet.

According to a sixth aspect, there is provided an apparatus for implementing the method according to the fifth aspect.

In one exemplary implementation, the apparatus comprises a processing circuitry and a memory circuitry. The memory circuitry stores computer program code which, when run in the processing circuitry, causes the apparatus to handle a data packet, wherein a field is assigned a value representing a length of said data packet. The computer program code, when run in the processing circuitry, may cause the apparatus to obtain the value representing the length of said data packet, determine a size of the field and establish an actual size of said data packet based on the determined size of the field and the obtained value representing the length of said data packet.

In one embodiment, the apparatus further comprises a receiving circuitry and the memory circuitry stores computer program code which, when run in the processing circuitry, causes the apparatus to receive the data packet.

According to a seventh aspect, there is provided an apparatus. The apparatus comprises means adapted to handle a data packet, where a field is assigned a value representing a length of the data packet. The apparatus may further comprise means adapted to obtain the value representing the length of the data packet and means adapted to determine a size of the field. The apparatus may further comprise means adapted to establish an actual size of the data packet based on the determined size of the field and the obtained value representing the length of the data packet.

According to an eight aspect, there is provided an apparatus. The apparatus comprises at least three modules. An obtaining unit is a first module of the apparatus configured to obtain a value representing the length of a data packet. A determining unit is a second module of the apparatus configured to determine a size of the field. A establishing unit is a third module of the apparatus configured to establish an actual size of the data packet based on the determined size of the field and the obtained value representing the length of said data packet.

In one exemplary embodiment, the apparatus may further comprise a receiving unit configured to receive the data packet.

In one exemplary embodiment, the apparatus may further comprise a determining unit configured to determine an offset value based on the determined size of the field and the apparatus may further comprise an adding unit configured to add the determined offset value to the obtained value representing the length of the data packet.

According to a ninth aspect, there is provided a computer program comprising instructions which, when executed on a processing circuitry, cause the processing circuitry to carry out the method according to the first aspect and/or the fifth aspect.

According to a tenth aspect, there is provided a carrier containing the computer program of the ninth aspect, wherein the carrier is one of an electronic signal, optical signal, radio signal, or computer readable storage medium.

The various proposed embodiments herein may allow using unused values, or code points, in order to increase the maximum size of a data packet. This can generally be done without increasing a size of a field.

BRIEF DESCRIPTION OF THE DRAWINGS

These and other aspects, features and advantages will be apparent and elucidated from the following description of various embodiments, reference being made to the accompanying drawings, wherein:

FIGS. 16 to 19 are flowcharts illustrating methods implemented in a communication system including a host computer, a base station and a user equipment.

DETAILED DESCRIPTION

The present invention will now be described more fully hereinafter. The present invention may, however, be embodied in many different forms and should not be construed as limited to the embodiments set forth herein; rather, these embodiments are provided by way of example so that this disclosure will be thorough and complete, and will fully convey the scope of the invention to those persons skilled in the relevant art. Like reference numbers refer to like elements throughout the description.

In one of its aspects, the disclosure presented herein concerns a method for assigning a value representing a length of a data packet to a field.

Figure 1:
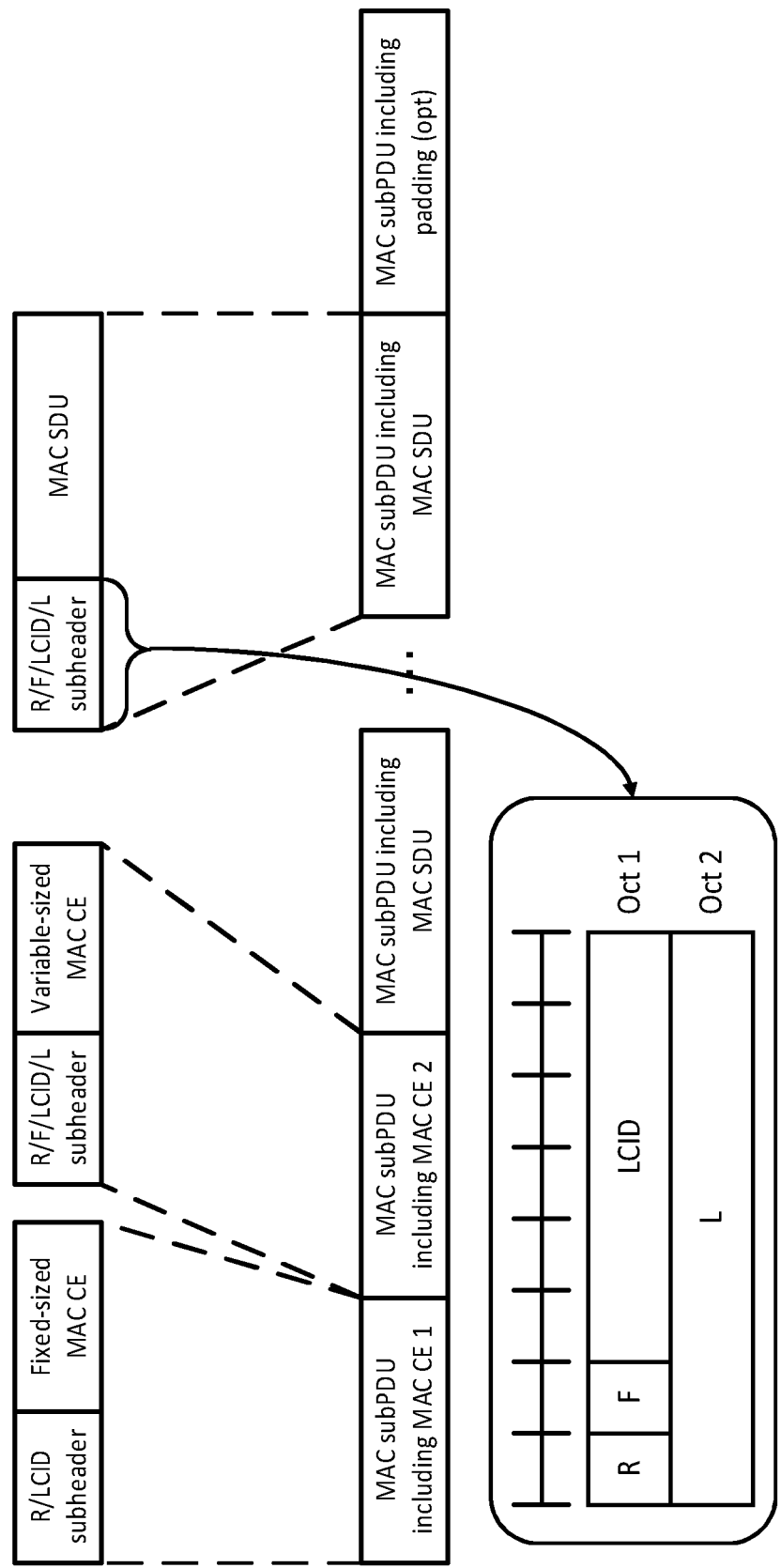
FIG. 1 illustrates a NR MAC.
Figure 2:
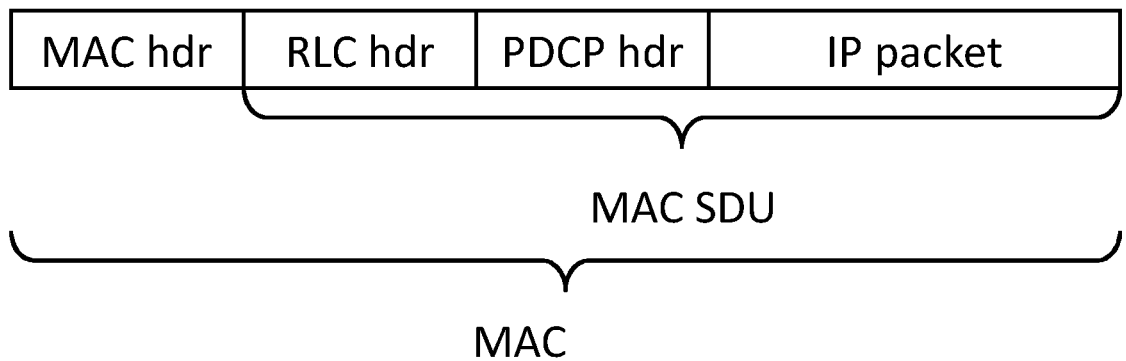
FIG. 2 illustrates a MAC PDU with an encapsulated MAC SDU.
Figure 3A:
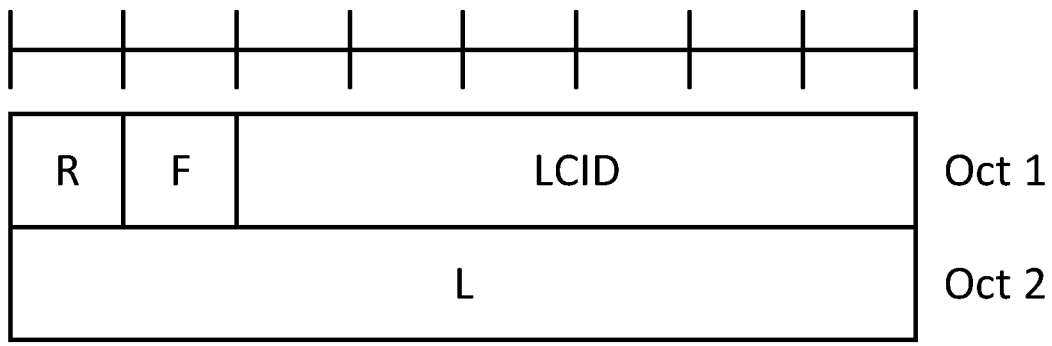
FIG. 3a shows an R/F/LCID/L MAC subheader with 8-bit L field.
Figure 3B:
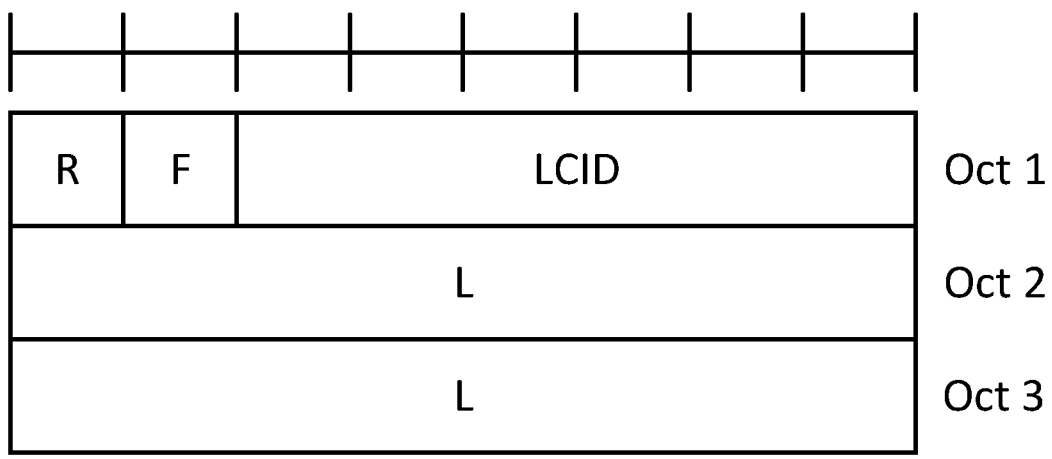
FIG. 3b shows an R/F/LCID/L MAC subheader with 16-bit L field.
Figure 4A:
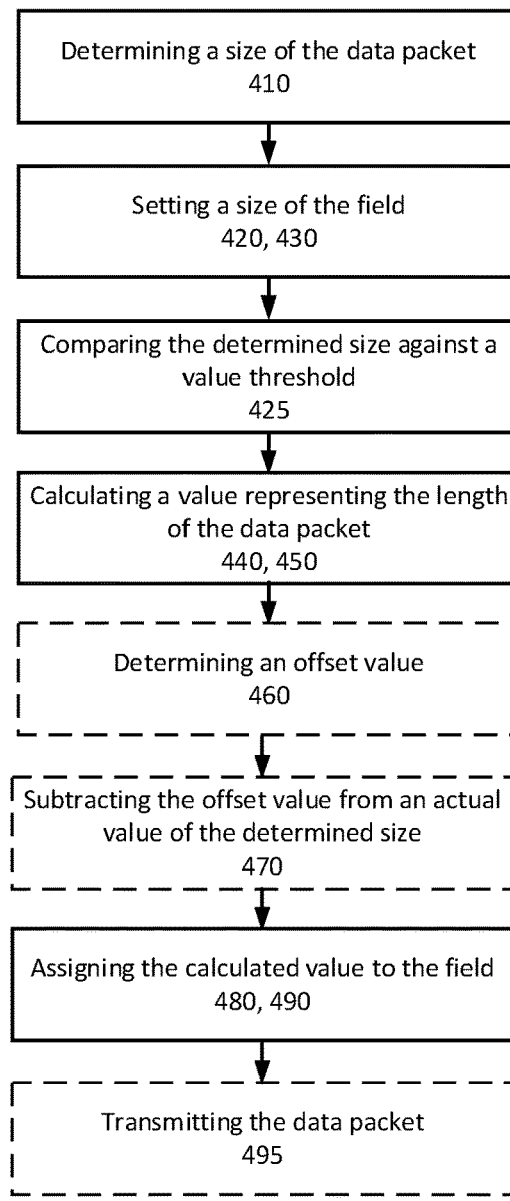
FIG. 4a is a flowchart of an example method performed by an apparatus.
Figure 4B:
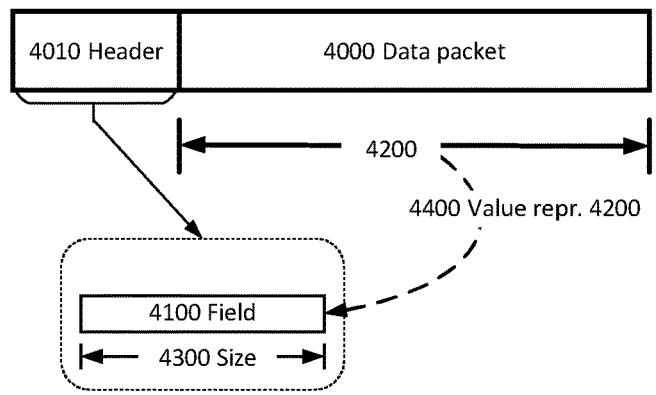
FIG. 4b shows an example data packet and an example field.

With reference to the FIGS. 4a and 4b, a first embodiment will now be described. FIG. 4a illustrates a method performed by an apparatus, and FIG. 4b illustrates one example of a data packet 4000 and a field 4100 applied in the method shown in the flowchart of FIG. 4a. The data packet 4000 illustrated in FIG. 4b may be accompanied with a header 4010. The header may comprise at least one field 4100, i.e. one or several fields. For simplicity and without limitation of the scope the embodiments described herein, only one field is illustrated in FIG. 4b. The method described with reference to FIG. 4a is a method for assigning a value 4400 to the field 4100. The value 4400 may represent a length of the data packet 4000.

The method starts in that a size 4200 of a data packet 4000 may be determined 410. The size 4200 of the data packet may be determined in, for example, number of bytes, and is dependence of the amount of data comprised in the data packet 4000.

Then, based on the determined size 4200 of the data packet 4000, a size 4300 of the field 4100 may be set 420, 430. For example, the size 4300 of the field 4100 may be set in bits. The size 4300 of the field 4100 generally has to be of a sufficient size, such that a value 4400 representing the length of the data packet 4000 can be assigned to the field 4100.

The determined size 4200 of the data packet 4000 may then be compared 425 against a value threshold. The value threshold may be a threshold value set in bytes if the size of the data packet is in bytes, such that the determined size 4200 of the data packet 4000 can be compared against the value threshold.

Thereafter, a value 4400 representing the length of the data packet may be calculated 440, 450. The value 4400 representing the length of the data packet may be a value that is not necessarily equal to the actual length 4200 of the data packet 4000, but may be used to deduce the actual length 4200, for example by a receiver. In some embodiments, the value 4400 representing the length of the data packet 4000 may be equal to the actual length 4200 for certain values 4400 of the data packet length and may be different from the actual length for other values representing the length of the data packet 4000.

The value may be calculated 440 450 based on the comparison of the determined size 4200 of the data packet 4000 against the value threshold and based on the determined size 4200 of the data packet. The calculated value 4400 representing the length of the data packet may thereafter be assigned 480, 490 to the field.

Accordingly, with the above-described method, it may be possible to use values, or code points, that traditionally have been unused. Because the value representing the length of the data packet that is assigned 480, 490 to the field is a calculated value, which is not necessarily the actual value, and the calculated value may be calculated 440, 450 first, after a comparison against the value threshold has been made, it is possible to assign more values to the field without increasing the size of the field.

In one exemplary embodiment, the method further comprises comparing the determined size of the data packet against a field threshold. The size of the field may be set based on the comparison. The field threshold may be a threshold value set in bytes if the data packet is in bytes, such that the determined size of the data packet can be compared against the field threshold. If the determined size of the data packet is below or equal to the field threshold, the size of the field may be set to a first size. Else, if the determined size of the data packet is above the field threshold, the size of the field may be set to a second size, which is different from the first size. The second size may be larger than the first size.

By comparing the determined size of the data packet against a field threshold, the size of the field may be set 420, 430 to an appropriate size. Different sizes of the data packets may require different sizes of the field. The field threshold is associated with the size of the field, and for a larger determined size of the data packet, the size of the field typically has to be increased.

The field threshold may for example be set to the formula 2 raised to the power of "the first size" and then minus 1, i.e. 2^(the first size)−1. In this exemplary embodiment, the first size may for example be 8 bits and the second size may be 16 bits. Accordingly, the field threshold may be set to 28-1, i.e. 255, bytes. If the size of the data packet is 255 bytes or less, the size of the field may be set 420 to be the first size of 8 bits. Else, if the size of the data packet is above the field threshold, i.e. above 255 bytes, the size of the field may be set 430 to a second size that may be equal to 16 bits.

In a further embodiment, there may be several field thresholds and when a determined size of the data packet is above a first field threshold, the determined size may be compared against a second field threshold. If the determined size is above said second field threshold, the field may be set to a third size, which is different from the first and second size. The third size may be larger than the other two sizes. Further, if the determined size of the data packet is above the second field threshold, it may be compared against a fourth threshold, etc. The number of field thresholds may not be limited.

In one exemplary embodiment, the determined size of the data packet may be compared 425 against a first value threshold. If the determined size of the data packet is below or equal to this first value threshold, the value representing the length of the data packet may be calculated 440 to be an actual value of the determined size of the data packet. This calculated value representing the length of the data packet may thereafter be assigned 480 to the field. Else, if the determined size of the data packet is above said first value threshold the value representing the length of the data packet may be calculated 450 based on the determined size of the data packet and this calculated value may be assigned 490 to the field.

In the exemplary embodiment described above, calculating 450 the value representing the length of the data packet may comprise determining 460 an offset value based on the determined size of the data packet and subtracting 470 the offset value from an actual value of the determined size of the data packet. The offset value may be determined in many different ways, giving different offset values for the same determined size of a data packet in different embodiments. However, the offset value may be determined based on the determined size of the data packet such that the offset values within the same embodiments always are associated with the determined sizes of the data packets in the same way.

The first value threshold may for example be equal to a formula $2^{\wedge}(\text{the first size of the field})-1$ and the offset value may be equal to a formula $2^{\wedge}(\text{the first size of the field})$. If the first size, for example, may be equal to 8 bits and the second size equal to 16 bits, the first value threshold is equal to 255 and the offset value 256. According to another example, the first value threshold may be equal to a formula $2^{\wedge}(\text{the second size of the field})-1$ and the offset value may be equal to a formula $2^{\wedge}(\text{the second size of the field})$.

By calculating 450 the value representing the length of the data packet using an offset value that may be subtracted from the actual value of the determined size of the data packet, it may be possible to assign a value representing the length of the data packet that would otherwise be unusable. The first values representing the length of the data packet would traditionally only be useable together with a respective field of a smaller size, as described previously. By subtracting 470 an offset value, which may be determined 460 based on the determined size of the data packet, the calculated value assigned 490 to the field will accordingly be smaller than the actual value. Thus, it is made possible to use all of the values representing a length of the data packet and not only the values representing the lengths of the data packet associated with the set size of the field. Consequently, the maximum size of the data packet may be increased.

The below reproduced Table 1, illustrates two different exemplary embodiments according to the present disclosure. In Table 1, the first column shows the determined size of the data packet. The size of the field, which is assigned the value representing the length of the data packet, is disclosed in column 2. The size of the field is in bits. Column 3 discloses the values traditionally representing the length of the data packet. The values are represented in hexadecimal. Column 4 and 5 disclose the corresponding values representing the length of the data packet for two exemplary embodiments according to the present disclosure.

TABLE 1 disclosing a size of a data packet associated with the size of the field and the value assigned to the field representing the length of the data packet according to two embodiments of the present disclosure.

| Size of data packet (bytes) | Size of field (bits) | Value representing length of the data packet (hex) - Traditionally | Value representing length of the data packet (hex) - Embodiment 1 | Value representing length of the data packet (hex) - Embodiment 2 |
|---|---|---|---|---|
| 1 | 8 | 0x01 | 0x01 | 0x01 |
| 2 | 8 | 0x02 | 0x02 | 0x02 |
| ... | ... | ... | ... | ... |
| 255 | 8 | 0xFF | 0xFF | 0xFF |
| 256 | 16 | 0x0100 | 0x0100 | 0x0000 |
| 257 | 16 | 0x0101 | 0x0101 | 0x0001 |
| ... | ... | ... | ... | ... |
| 65534 | 16 | 0xFFFE | 0xFFFE | 0xFEFE |
| 65535 | 16 | 0xFFFF | 0xFFFF | 0xFEFF |
| 65536 | 16 | N/A | 0x0000 | 0xFF00 |
| 65537 | 16 | N/A | 0x0001 | 0xFF01 |
| ... | ... | ... | ... | ... |
| 65790 | 16 | N/A | 0x00FE | 0xFFFE |
| 65791 | 16 | N/A | 0x00FF | 0xFFFF |

The first embodiment, disclosed in column 4, here named embodiment 1, illustrates an embodiment with a first value threshold equal to the formula $2^{\wedge}(\text{the second size of the field})-1$. As the first size of the field is 8 bits and the second size of the field is 16 bits, the first value threshold equals to 65535. The offset value is equal to the formula $2^{\wedge}(\text{the second size of the field})$, and accordingly is 65536. As seen in column 4, by subtracting the offset value from the actual value of the determined size of the data packet, it is possible to use the, traditionally, unused values 0x0000 to x00FF and accordingly, to increase the maximum size of the data packet from 65535 to 65791. This is made possible without increasing the size of the field from 16 bits.

The second embodiment, disclosed in column 5, here named embodiment 2, illustrates an embodiment with a first value threshold equal to the formula $2^{\wedge}(\text{the first size of the field})-1$, hence with a the first value threshold equal to 255. The offset value is equal to the formula $2^{\wedge}(\text{the first size of the field})$, and accordingly 256.

The below reproduce Table 2, illustrates another, a third, embodiment according to the present disclosure. Table 2 illustrates an embodiment with multiple different sized fields. The table is illustrated with five different sizes of the field; 4, 8, 12, 16 and 20 bits, respectively. Columns 1 shows the determined size of the packet. Column 2 and 3 show the size of the field in bits and the value of the field in hexadecimal according to prior art. Column 4 and 5 show the size of the field in bits and the value of the field in hexadecimal according to the third embodiment. Column 6 and 7 disclose the determined offset value and the formula for the offset value.

TABLE 2 disclosing a third embodiment with multiple different sized fields according to the present disclosure.

| Size of data packet (bytes) | Size of field (bits) | Value representing length of data packet (hex) - Traditionally | Size of field (bits) - Embodiment 3 | Value representing length of data packet (hex) - Embodiment 3 | Offset value | Offset formula |
|---|---|---|---|---|---|---|
| 0 | 4 | 0x0 | 4 | 0x0 | 0 | |
| 1 | 4 | 0x1 | 4 | 0x1 | 0 | |
| 2 | 4 | 0x2 | 4 | 0x2 | 0 | |
| 14 | 4 | 0xE | 4 | 0xE | 0 | |
| 15 | 4 | 0xF | 4 | 0xF | 0 | |
| 16 | 8 | 0x10 | 8 | 0x00 | 16 | $2^4$ |
| 17 | 8 | 0x11 | 8 | 0x01 | 16 | |
| 18 | 8 | 0x12 | 8 | 0x02 | 16 | |
| 254 | 8 | 0xFE | 8 | 0xEE | 16 | |
| 255 | 8 | 0xFF | 8 | 0xEF | 16 | |
| 256 | 12 | 0x100 | 8 | 0xF0 | 16 | |
| 257 | 12 | 0x101 | 8 | 0xF1 | 16 | |
| 258 | 12 | 0x102 | 8 | 0xF2 | 16 | |
| 270 | 12 | 0x10E | 8 | 0xFE | 16 | |
| 271 | 12 | 0x1 0F | 8 | 0xFF | 16 | |
| 272 | 12 | 0x110 | 12 | 0x000 | 272 | $2^4 + 2^8$ |
| 273 | 12 | 0x111 | 12 | 0x001 | 272 | |
| 274 | 12 | 0x112 | 12 | 0x002 | 272 | |
| 4094 | 12 | 0xFFE | 12 | 0xEEE | 272 | |
| 4095 | 12 | 0xFFF | 12 | 0xEEF | 272 | |
| 4096 | 16 | 0x1000 | 12 | 0xEF0 | 272 | |
| 4097 | 16 | 0x1001 | 12 | 0xEF1 | 272 | |
| 4098 | 16 | 0x1002 | 12 | 0xEF2 | 272 | |
| 4366 | 16 | 0x110E | 12 | 0xFFE | 272 | |
| 4367 | 16 | 0x110F | 12 | 0xFFF | 272 | |
| 4368 | 16 | 0x1110 | 16 | 0x0000 | 4368 | $2^4 + 2^8 + 2^{12}$ |
| 4369 | 16 | 0x1111 | 16 | 0x0001 | 4368 | |
| 4370 | 16 | 0x1112 | 16 | 0x0002 | 4368 | |
| 65534 | 16 | 0xFFFE | 16 | 0xEEEE | 4368 | |
| 65535 | 16 | 0xFFFF | 16 | 0xEEEF | 4368 | |
| 65536 | 20 | 0x10000 | 16 | 0xEEF0 | 4368 | |
| 65537 | 20 | 0x10001 | 16 | 0xEEF1 | 4368 | |
| 65538 | 20 | 0x10002 | 16 | 0xEEF2 | 4368 | |
| 69902 | 20 | 0x1110E | 16 | 0xFFFE | 4368 | |
| 69903 | 20 | 0x1110F | 16 | 0xFFFF | 4368 | |
| 69904 | 20 | 0x11110 | 20 | 0x00000 | 69904 | $2^4 + 2^8 + 2^{12} + 2^{16}$ |
| 69905 | 20 | 0x11111 | 20 | 0x00001 | 69904 | |
| 69906 | 20 | 0x11112 | 20 | 0x00002 | 69904 | |

According to embodiment 3, the determined size of the data packet is compared against a value threshold. The value threshold is equal to the formula $2^{\wedge}$(the first size of the field)−1. Accordingly, the value threshold is equal to 15, as the first size of the field in this embodiment is equal to 4. Hence, for all determined sizes of the data packet that is above this value threshold, the value representing the length of the data packet will be calculated based on the determined size of the data packet.

According to embodiment 3, the value representing the length of the data packet will be calculated by determining an offset value based on the determined size of the data packet and subtracting the determined offset value from an actual value of the determined size of the data packet. The offset value, as previously discussed, may be calculated in many different ways, but according to this embodiment, the offset value is calculated with the formula $2^{\wedge}$(the first size of the field)+ . . . +$2^{\wedge}$(the size previous to the set size of the field). Hence, if the determined size of the data packet is 65537 bytes, the size of the field is set to be 16 bits. As can be seen in Table 2, the first size of the field is equal to 4 bits, the second size 8 bits, the third size 12 bits and the fourth size 16 bits. Hence, the size previous to the set size of the field is the third size and the offset value is thus determined to be equal to the formula $2^{\wedge}$(the first size of the field)+$2^{\wedge}$(the second size of the field)+$2^{\wedge}$(the third size of the field)=$2^4$+$2^8$+$2^{12}$=4368.

As seen in the table, by using the determined offset values in column 6 and subtracting the offset value from the actual value of the determined size of the data packet, it is possible to increase the maximum size of the data packet, but without unnecessarily increasing the size of the field. As seen in Table 2, a data packet of the size of, for example, 69903 bytes according to the various embodiments disclosed herein, will require a size a field of 16 bits, while a data packet of that size traditionally would require a field of 20 bits.

The present disclosure is not in any way limited to the three above described embodiments. Rather, these are only examples to illustrate the various embodiments in a clear and an easy-understood way.

In one exemplary embodiment, the determined size of the data packet may be above a second value threshold, which may be larger than the first value threshold. Then the determined size of the data packet may be compared 425 against a third value threshold. If the determined size of the data packet is below or equal to the third value threshold, the value representing the length of the data packet may be calculated 440 to be an actual value of the determined size of the data packet. The calculated value representing the length of the data packet may then be assigned 480 to the field. Else, if the determined size of the data packet is above the third value threshold, the value representing the length of the data packet may be calculated 450 based on the determined size of the data packet and the calculated value may be assigned 490 to the field.

Figure 5:
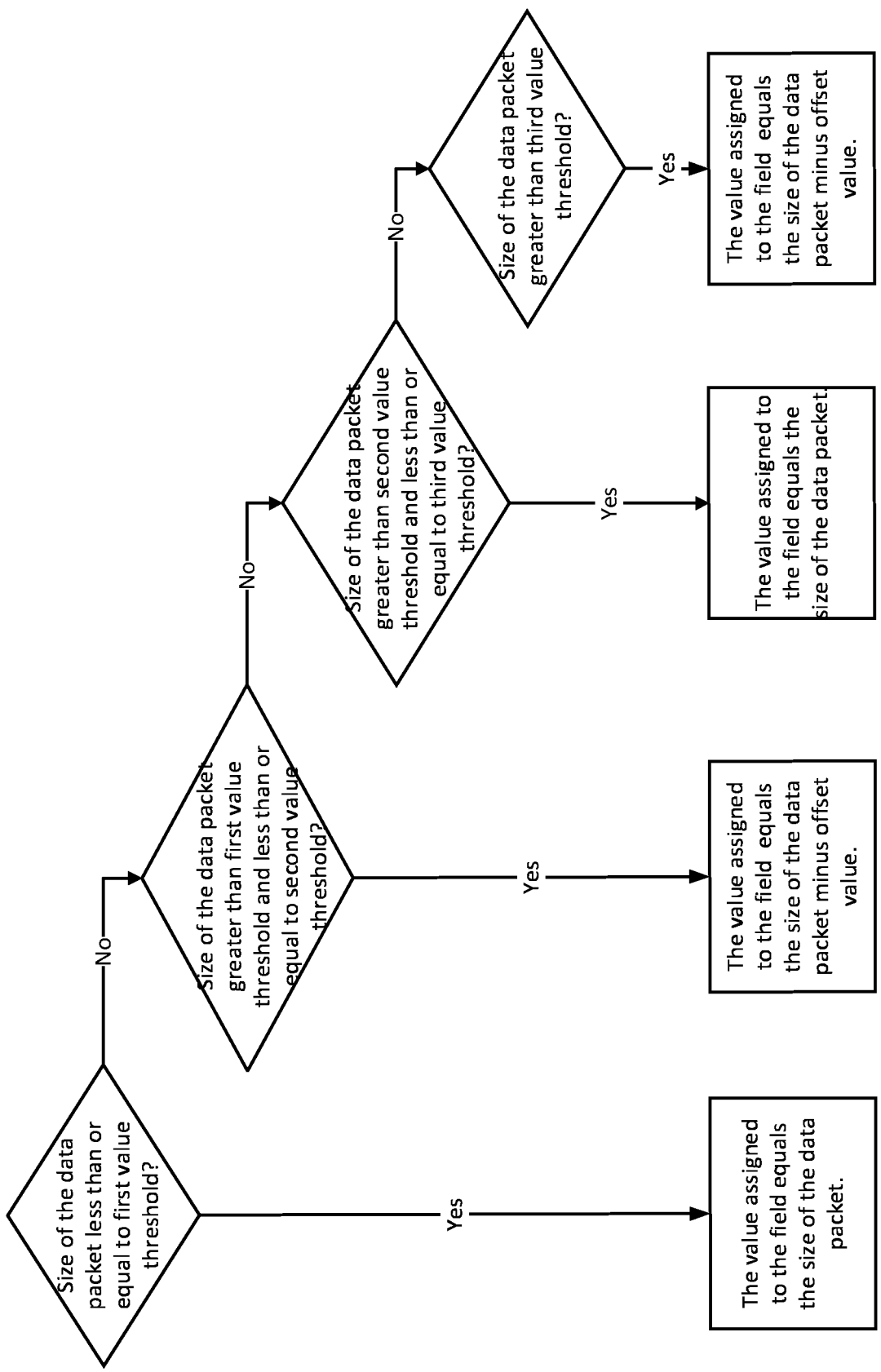
FIG. 5 is a flowchart according to an example method.

One example in accordance with the previously described embodiment may now be described with reference to FIG. 5. As can be seen in FIG. 5, the determined size of the data packet is first compared 425 against a first value threshold. If the determined size is below or equal to this first value threshold, the value representing the length of the data packet is calculated 440 to be an actual value of the determined size of the data packet and this calculated value is assigned to the field. If the determined size is greater than this first value threshold, the determined size of the data packet is compared against a second value threshold. If the determined size of the data packet is smaller or equal to the second value threshold, the value representing the length of the data packet is calculated 450 by determining an offset value based on the determined size of the data packet. The offset value is then subtracted from the actual value of the determined size of the data packet and this calculated value is assigned to the field. If the determined size of the data packet is greater than the second value threshold, but smaller or equal to a third value threshold, the value representing the length of the data packet is calculated 450 to be an actual value of the determined size of the data packet and this calculated value is assigned to the field. Else, if the determined size is greater than the third value threshold, the value representing the length of the data packet is calculated 450 by determining an offset value based on the determined size of the data packet. The offset value is then subtracted from the actual value of the determined size of the data packet and this calculated value is assigned to the field.

The above-described embodiment including several thresholds, is yet another example of how embodiments according to the present disclosure may be used in order to increase the maximum size of the data packet, but without increasing the size of the field.

In one exemplary embodiment, the data packet may be a MAC SDU and the field may be an L-field. The L-field may be located in a header in a PDU carrying the MAC SDU. One exemplary embodiment may be described in conjunction with FIG. 6.

Figure 6:
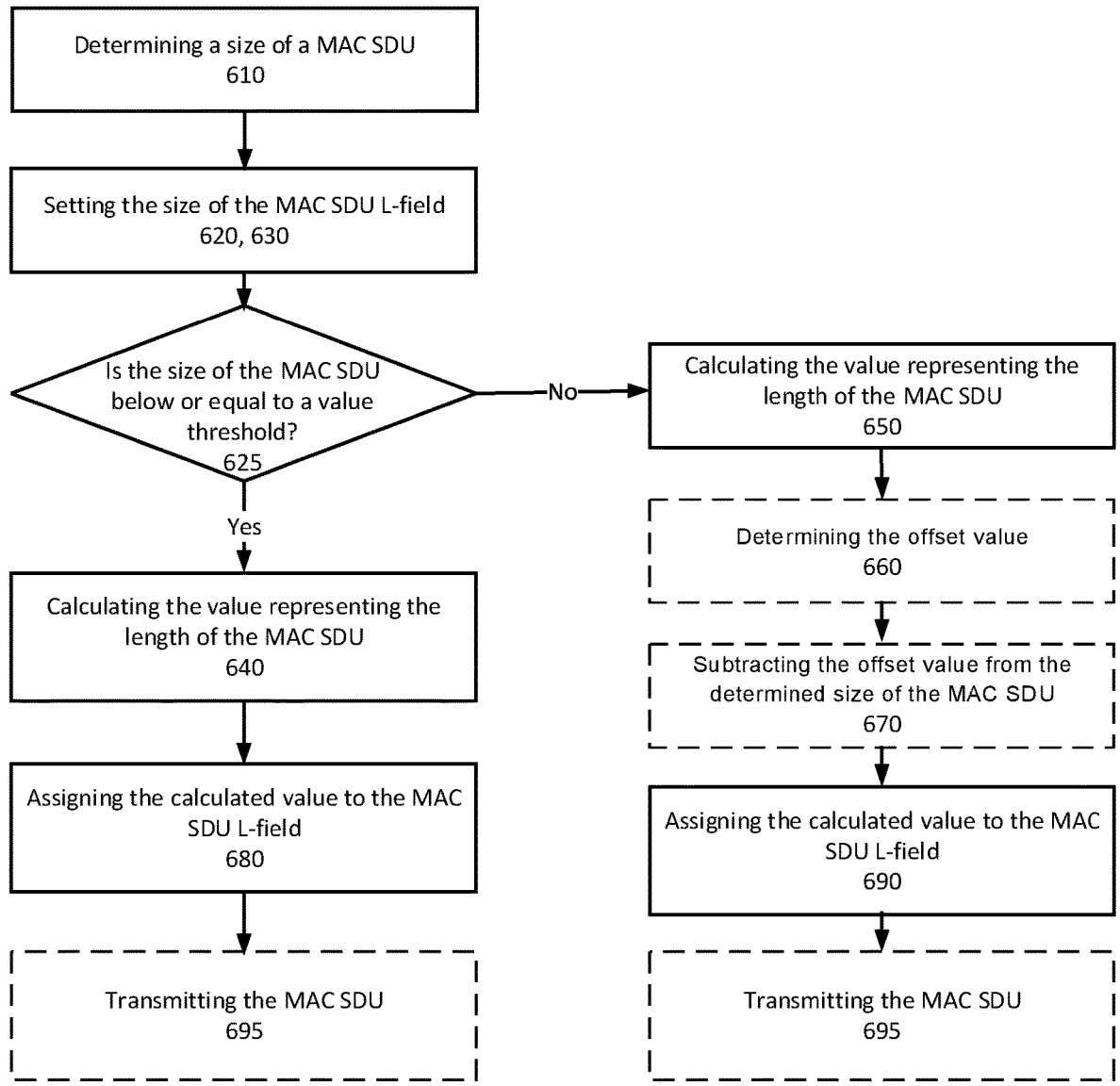
FIG. 6 is a flowchart of a further example method performed by an apparatus.

In accordance with FIG. 6, the method may start with determining 610 the size of the MAC SDU. The size of the MAC SDU L-field may be set 620, 630 based on the determined size of the MAC SDU. The determined size of the MAC SDU may be compared 625 against a first value threshold. If the determined size of the MAC SDU is below or equal to said first value threshold, the value representing the length of the MAC SDU may be calculated 640 to be the actual value of the determined size of the MAC SDU and the calculated value may be assigned 680 to the MAC SDU L-field. Else, if the determined size of the MAC SDU is above said first value threshold, the value representing the length of the MAC SDU may be calculated 650 based on the determined size of the MAC SDU. The value representing the length of the MAC SDU may be calculated 650 by determining 660 an offset value based on the determined size of the MAC SDU. The offset value may be subtracted 670 from the actual value of the determined size of the MAC SDU. The calculated value may thereafter be assigned 690 to the MAC SDU L-field.

The previous described exemplary embodiment uses the MAC protocol, but it should be understood that the various embodiments may be applied to any protocol, which encapsulates PDUs or packets from another protocol and describes the size of said PDUs or packets, or the total size of the encapsulating PDU or packet, using a length field.

In one exemplary embodiment, the data packet, for example a MAC SDU, may be transmitted 495, 695 to a receiving apparatus.

According to a second aspect, there is provided an apparatus for implementing the method according to the first aspect.

Figure 7:
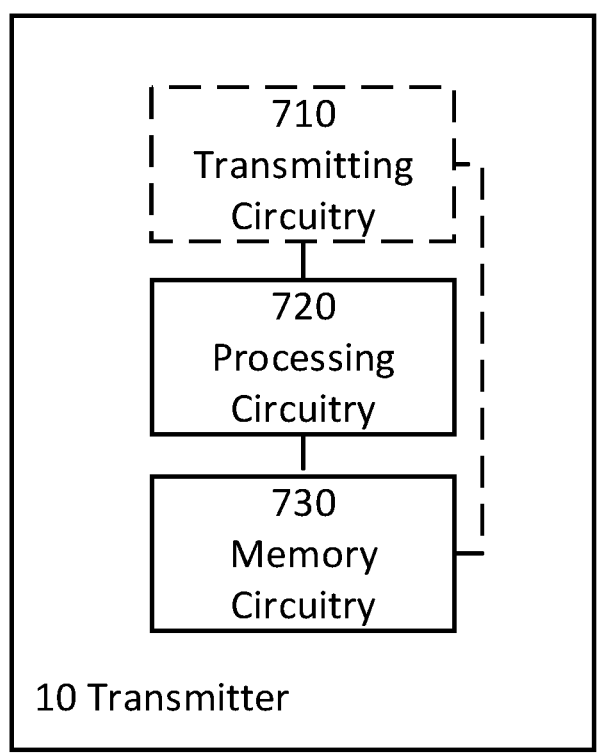
FIG. 7 shows an example implementation of an apparatus.

FIG. 7 discloses an example implementation of an apparatus 10, which may be configured to perform the above-mentioned method. The apparatus 10 may comprise a processor, or a processing circuitry 720, and a memory, or a memory circuitry 730. The memory circuitry 730 may store computer program code which, when run in the processing circuitry 720, may cause the apparatus 10 to assign a value representing a length of a data packet to a field.

In one exemplary embodiment, the computer program code, when run in the processing circuitry 720, may cause the apparatus 10 to determine a size of the data packet and to set a size of the field based on the determined size of the data packet. The apparatus 10 may then be caused to compare the determined size of the data packet against a value threshold and to calculate a value representing the length of the data packet based on the determined size of the data packet. Thereafter, the apparatus 10 may be caused to assign the calculated value representing the length of the data packet to the field.

In one exemplary embodiment, the memory circuitry 730 storing computer program code which, when run in the processing circuitry 720, may cause the apparatus 10 to set the size of the field based on a comparison of the determined size of the data packet against a field threshold. If the determined size of the data packet is below or equal to a field threshold, the size of the field may be set to a first size. Else, if the determined size of the data packet is above the field threshold, the size of the field may be set to a second size, which is different from the first size. The second size may for example be larger than the first size.

In one exemplary embodiment, the memory circuitry 730 storing computer program code which, when run in the processing circuitry 720 may cause the apparatus 10 to compare the determined size of the data packet against a first value threshold. If the determined size of the data packet is below or equal to a first value threshold, the value representing the length of the data packet may be calculated to be an actual value of the determined size of the data packet. The calculated value representing the length of the data packet may then be assigned to the field. Else, if the determined size of the data packet is above said first value threshold, the apparatus may be caused to calculate the value representing the length of the data packet based on the determined size of the data packet and to assign the calculated value to the field.

In the exemplary embodiment described above, the memory circuitry 730 storing computer program code which, when run in the processing circuitry 720, may cause the apparatus 10 to calculate the value representing the length of the data packet by determining an offset value based on the determined size of the data packet, and subtracting the offset value from an actual value of said determined size of the data packet.

In one exemplary embodiment, wherein the determined size of the data packet is above a second value threshold which is larger than the first value threshold, the memory circuitry 730 storing computer program code which, when run in the processing circuitry 720 may cause the apparatus 10 to compare the determined size of the data packet against a third threshold. If the determined size of the data packet is below or equal to the third value threshold, the apparatus 10 may be caused to calculate the value representing the length of the data packet to be an actual value of the determined size of the data packet and assign the calculated value representing the length of the data packet to the field. Else, if the determined size of the data packet is above the third value threshold, the apparatus 10 may be caused to calculate the value representing the length of the data packet based on the determined size of the data packet and to assign the calculated value to the field.

In one exemplary embodiment, the data packet may be a Media Access Control (MAC) Service Data Unit (SDU) and the field may be an L-field. The L-field may be located in a header in a Protocol Data Unit (PDU) carrying the MAC SDU. The memory circuitry 730, within the apparatus 10, stores computer program code which, when run in the processing circuitry 720, may cause the apparatus 10 to determine the size of the MAC SDU, set the size of the MAC SDU L-field based on the determined size of the MAC SDU, and compare the determined size of the MAC SDU against a first value threshold. If the determined size of the MAC SDU is below or equal to the first value threshold, the apparatus 10 may be caused to calculate the value representing the length of the MAC SDU to be the actual value of the determined size of the MAC SDU, and to assign the calculated value to the MAC SDU L-field. Else, if the determined size of the MAC SDU is above the first value threshold, the apparatus 10 may be caused to calculate the value representing the length of the MAC SDU by determining an offset value based on the determined size of the MAC SDU and subtracting the offset value from an actual value of said determined size of the MAC SDU. The apparatus 10 may thereafter be caused to assign the calculated value to the MAC SDU L-field.

In one exemplary embodiment, as illustrated in FIG. 7, the apparatus may further comprise a transmitting circuitry 710. In this embodiment, the memory circuitry 730 may store computer program code which, when run in the processing circuitry 720, may cause the apparatus 10 to transmit the data packet, for example a MAC SDU, to a receiving apparatus. The apparatus may be embodied as a transmitter.

According to a third aspect, the apparatus 10 may comprise means adapted to assign a value representing the length of a data packet to a field. The apparatus 10 may further comprise means adapted to determine a size of the data packet, and means adapted to set a size of the field based on the determined size of the data packet. The apparatus 10 may further comprise means adapted to compare the determined size of the data packet against a value threshold; means adapted to calculate a value representing the length of the data packet based on the determined size of the data packet; and means adapted to assign the calculated value representing the length of the data packet to the field.

Figure 8:
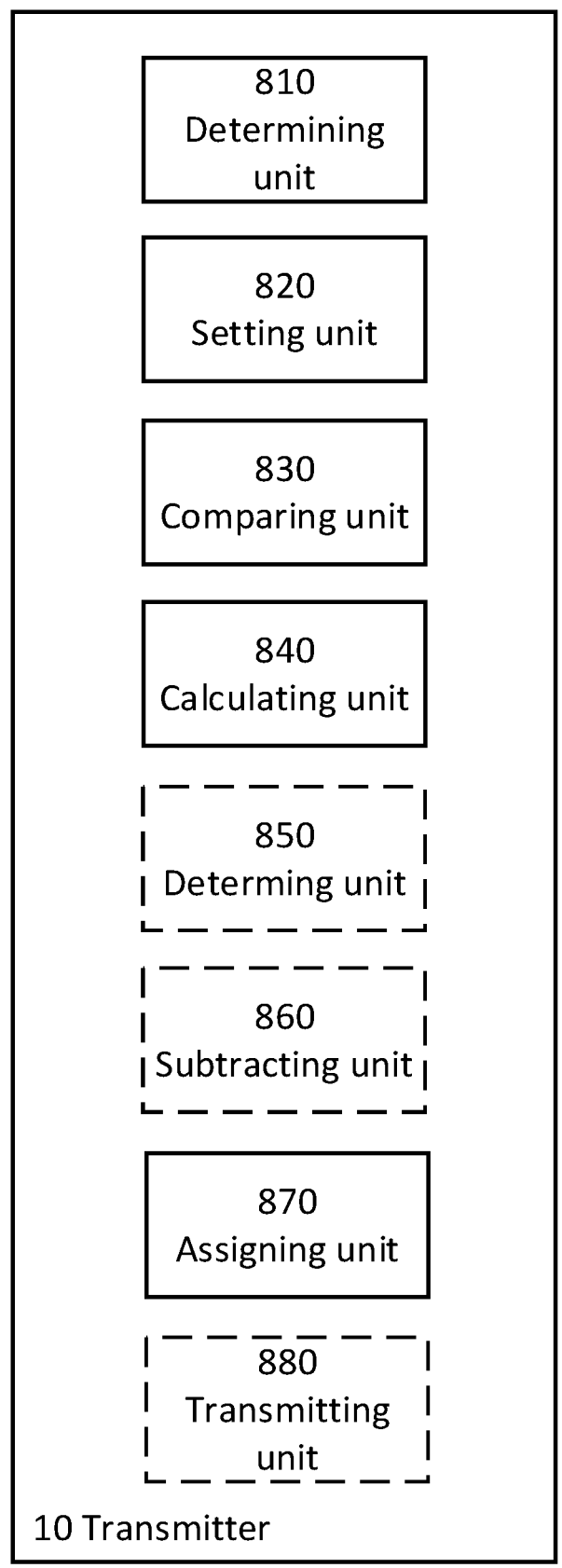
FIG. 8 shows a further example implementation of an apparatus.

According to a fourth aspect, as illustrated in FIG. 8, the apparatus may comprise at least five modules. A determining unit 810 of the apparatus 10 is a first module configured to determine a size of the data packet. A setting unit 820 is a second module configured to set a size of the field based on the determined size of the data packet. A comparing unit 830 is a third module configured to compare the determined size of the data packet against a value threshold. A calculating unit 840 is a fourth module configure to calculate a value representing the length of the data packet based on the determined size of the data packet. An assigning unit 870 is a fifth module configured to assign the calculated value representing the length of the data packet to the field.

In one exemplary embodiment, the apparatus 10 may further comprise a determining unit 850 configured to determine an offset value based on the determined size of the data packet and the apparatus may further comprise an subtracting unit 860 configured to subtract the determined offset valued from an actual value of the determined size of the data packet.

In one exemplary embodiment, the apparatus 10 may further comprise a transmitting unit 880 configured to transmit a data packet to a receiving apparatus.

According to a fifth aspect, the disclosure presented herein concerns a method for handling a data packet, wherein a field is assigned a value representing a length of the data packet.

Figure 9:
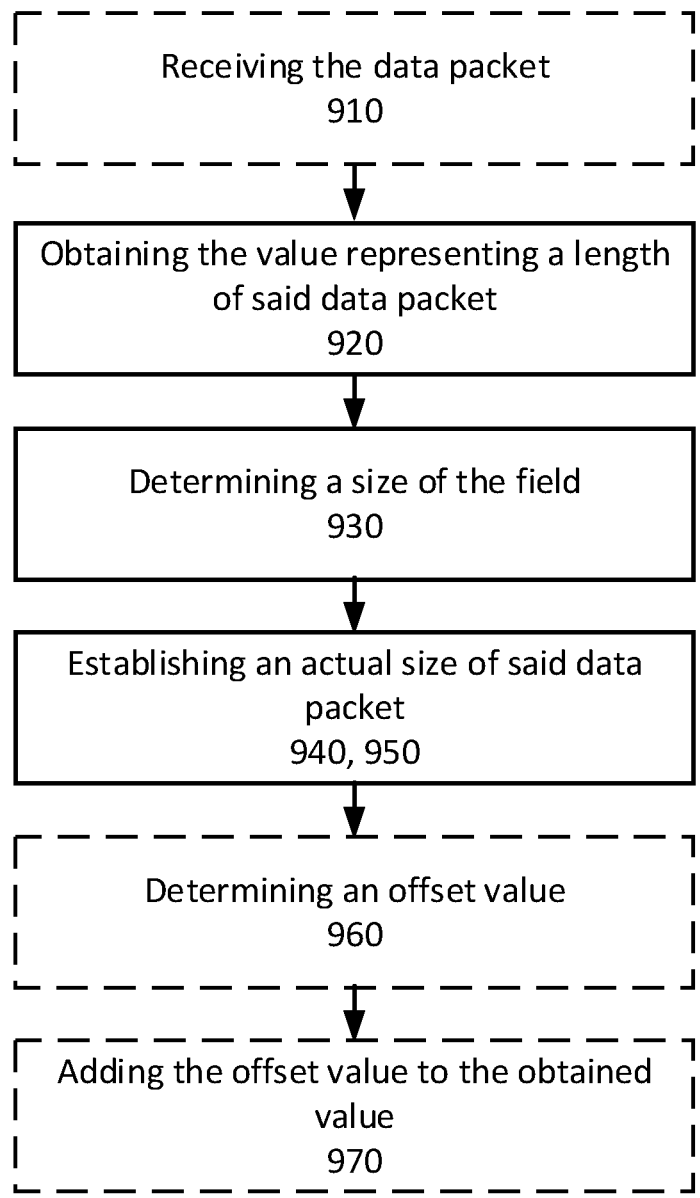
FIG. 9 is a flowchart of an example method performed by an apparatus.

With reference to the FIG. 9, an embodiment will now be described. FIG. 9 illustrates a method performed by an apparatus. The above-mentioned value representing the length of the data packet may be obtained 920. A size of the field, which is assigned the value representing the length of said data packet, may be determined 930. The size of the field may be in bits. Based on the obtained value representing the length of the field and the determined size of the field, an actual size of the data packet is established 940, 950.

Accordingly, as the above-described method establishing 940, 950 the actual size of the data packet based on both the obtained value representing the length of the field and the determined size of the field, it may be possible to handle data packets with increased sizes compared to previously known solutions. This may be achieved because of the possibility to use the previous unused values, or code points, of the field.

In one exemplary embodiment, if the determined size of the field is equal to a first size, the actual size of the data packet may be established 940 to be the value assigned to the field. Else, if the determined size of the field is equal to a second size, which is different from the first size, the actual size of said data packet may be established 950 based on the determined size of the field and the obtained value representing the length of said data packet. The second size of the field may be bigger than the first size. The first size may for example be 8 bits and the second size for example 16 bits.

In the above-described exemplary embodiment, the establishing 950 of the actual size of said data packet may comprise determining 960 an offset value based on the determined size of the field, and adding 970 the determined offset value to the obtained value representing the length of said data packet. The offset value may for example be determined to be equal to a formula 2^(the first size of the field). Accordingly, if the first size is 8 bits and the second size is 16 bits, the offset value may be equal to 256.

In a corresponding way as described for the first aspect according to the present disclosure, the offset value may be determined in many different ways giving different offset values for the same determined size of the field in different embodiments. However, as the offset value always may be determined based on the determined size of the field, the offset value within the same embodiment is always correlated with the obtained value representing the length of the data packets in the same way.

However, even if the above-described embodiments are described with reference to two different sizes of the field, the disclosure herein may apply to any number of sizes of the field. According to one example, any size of the field that is larger than the first size of the field is represented by the second size. Hence, the second size may comprise any size that is larger than the first size and the actual size of any of these data packets may be established 950 based on the determined size of the field and the obtained value representing the length of the data packet. With reference to Table 2, any obtained value associated with a field of a size of 8, 12, 16 or 20, is associated with the second size according to the present disclosure.

Figure 10:
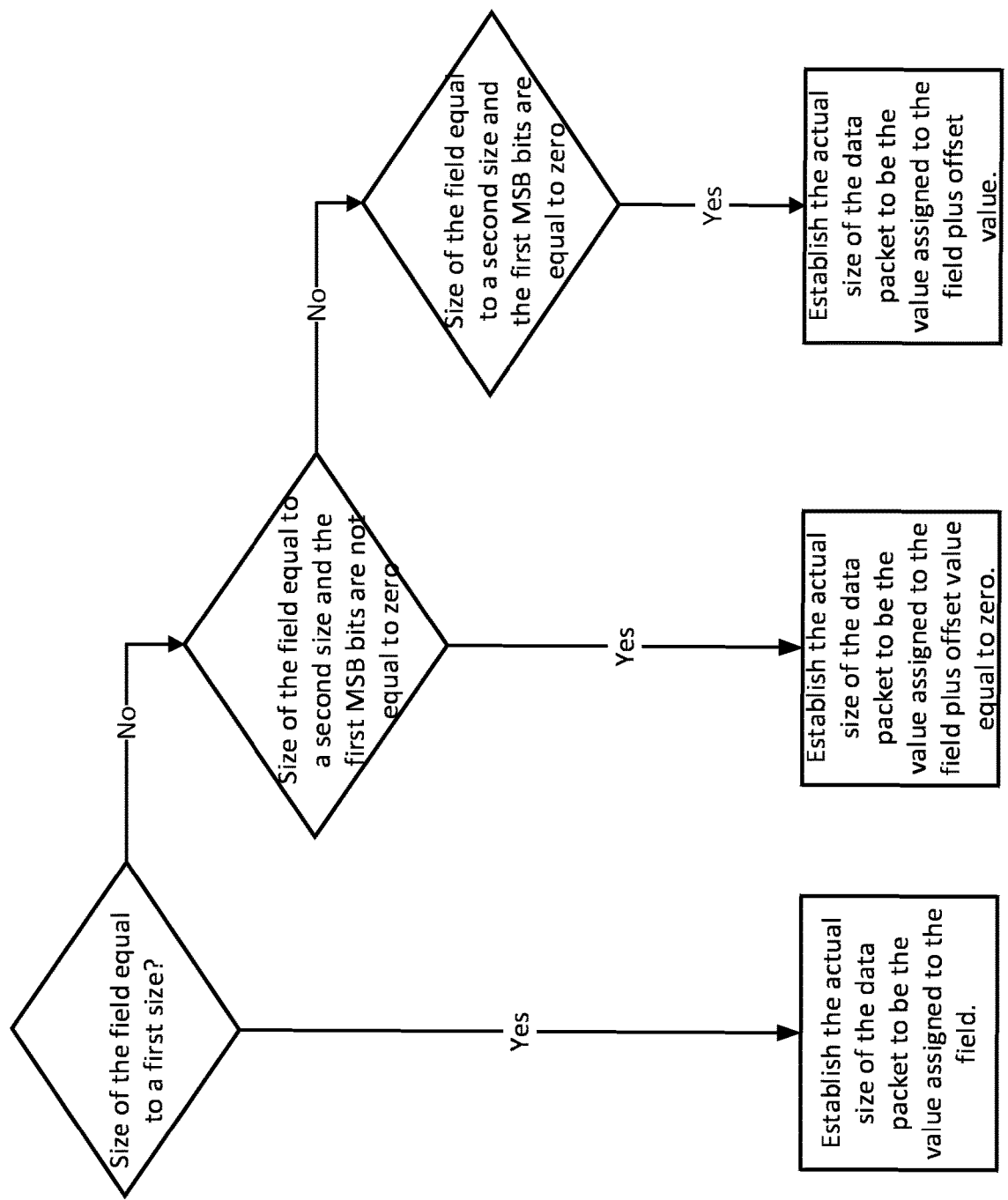
FIG. 10 is a flowchart according to a further example method.

According to another embodiment, which is described with reference to FIG. 10, the offset value may be determined based on the determined size of the field and based on the first bits of the field. The first bits are represented by a formula the second size minus the first size. Accordingly, if the first size is 8 bits and the second size is 16 bits, the first bits of the fields are represented by the first 8 (16-8) Most Significant Bits (MSB). According to the embodiment, if the size of the field is equal to the first size, the actual size of the data packet is established to be the value assigned to the field. Else, if the size of the field is equal to a second size, the first MSB are checked. If the first MSB are not equal to zero, the offset value may be determined to be equal to zero and the established actual size of the data packet may be the obtained value representing the length of the data packet plus the offset value zero. However, if the first MSB are equal to zero, the offset value is determined to be equal to a formula 2^(the second size of the field).

Accordingly, by establishing 940, 950 the actual size of the data packet by determining an offset value that may be added to the obtained value representing the length of the data packet, it may be possible to handle data packets that use traditionally unused values representing the length of the data packet that would be unusable. Traditionally, the first values of the field would be unusable as they only could be used together with a respective field of a smaller size, as described previously. By adding 970 an offset value, which may be determined based on the determined size of the field and the obtained value representing the length of the data packet, the established actual size of the data packet will accordingly be larger than the obtained 920 value representing the length of the data packet. Thus, it will be possible to handle data packets that use all of the values representing a length of the data packet and not only the values representing the lengths of the data packet originally associated with the set size of the field. Consequently, the maximum size of the data packet may be increased.

In one exemplary embodiment, the data packet may be a MAC SDU and the field may be an L-field. The L-field may be located in a header in a PDU carrying the MAC SDU. One exemplary embodiment may be described in conjunction with FIG. 11.

Figure 11:
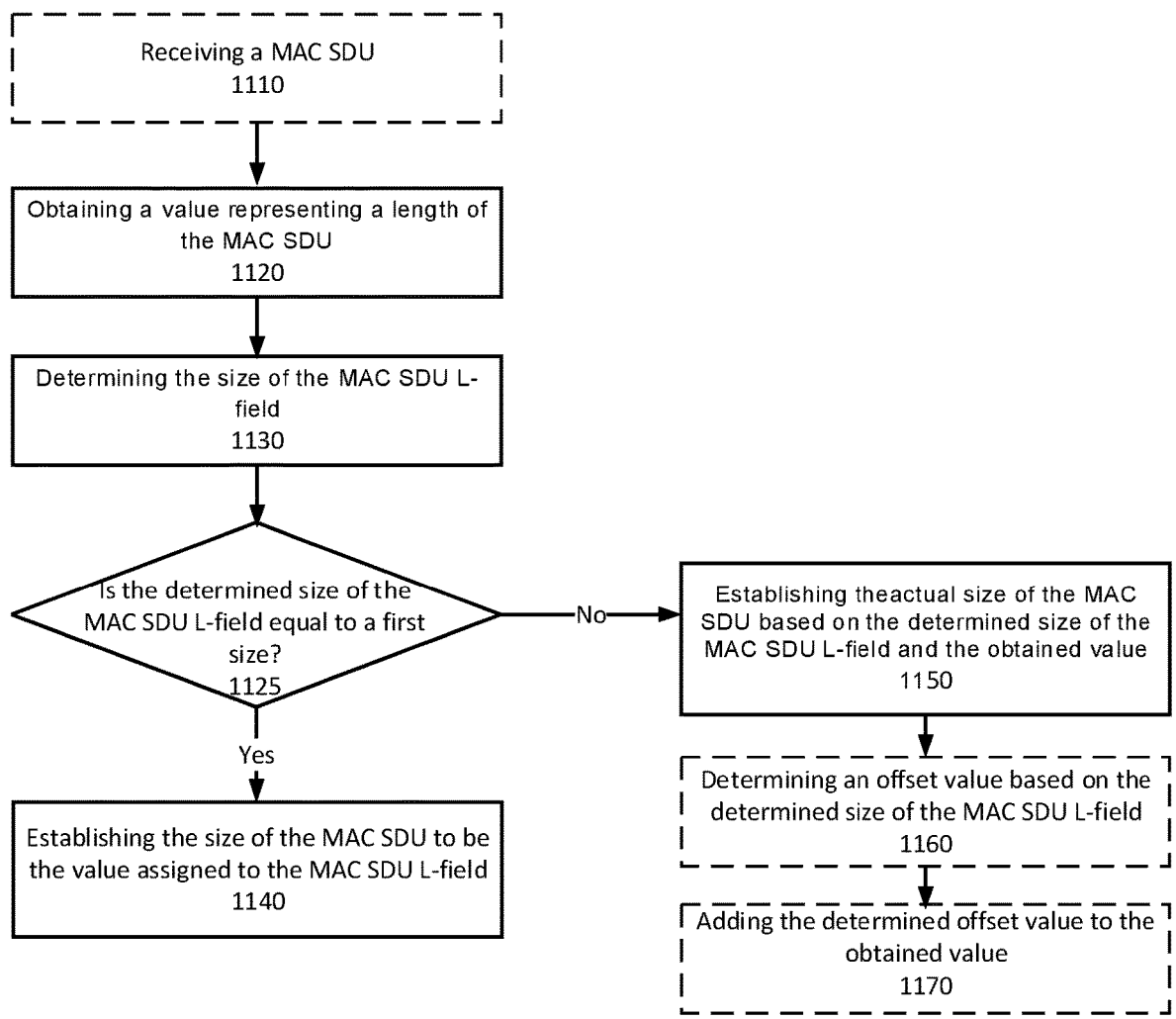
FIG. 11 is a flowchart of a further example method performed by an apparatus.

In accordance with FIG. 11, the method may comprise obtaining 1120 the value representing a length of the MAC SDU. The size of the MAC SDU L-field may be determined 1130. If the determined size of the MAC SDU L-field is equal to a first size 1140, the actual size of the MAC SDU may be established 1140 to be the value assigned to the MAC SDU L-field. Else, if the determined size of the MAC SDU L-field is equal to a second size, which is different from the first size, the actual size of the MAC SDU may be established 1150 based on the determined size of the field and the obtained value representing the length of the data packet. The second size may for example be larger than the first size. The actual size of the data packet may for example be established 1150 by determining 1160 the offset value based on the determined size of the MAC SDU L-field and then by adding 1170 the determined offset value to the obtained value representing the length of said MAC SDU.

In one exemplary embodiment, the data packet, for example a MAC SDU, may be received 910, 1110 from a transmitting apparatus.

According to a sixth aspect, there is provided an apparatus for implementing the method according to the fifth aspect.

Figure 12:
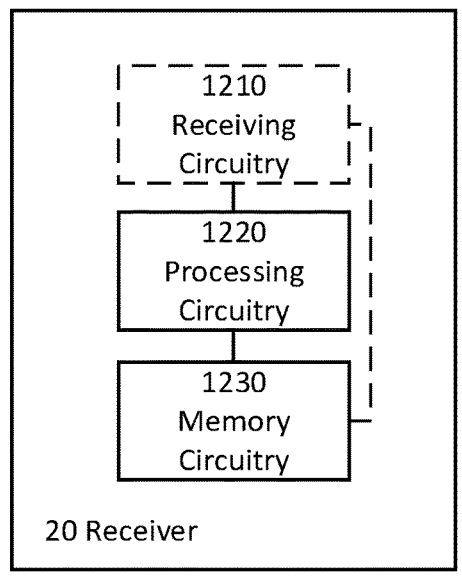
FIG. 12 shows an example implementation of an apparatus.

FIG. 12, discloses an example implementation of an apparatus 20, which may be configured to perform the above-described method. The apparatus 20 may comprise a processing circuitry 1220 and a memory circuitry 1230. The memory circuitry may store computer program code which, when run in the processing circuitry 1220, may cause the apparatus 20 to handle a data packet, wherein a field is assigned a value representing a length of the data packet.

In one exemplary embodiment, the computer program code, when run in the processing circuitry 1220, may cause the apparatus 20 to obtain the value representing the length of the data packet. The apparatus 10 may then be caused to determine a size of the field and to establish an actual size of the data packet based on the determined size of the field and the obtained value representing the length of said data packet.

In one exemplary embodiment, the memory circuitry 1230 may store computer program code which, when run in the processing circuitry 1220, may cause the apparatus 20 to determine a size of the field. If the determined size of the field is equal to a first size, the apparatus 20 may be caused to establish the actual size of the data packet to be the value assigned to the field. Else, if the determined size of the field is equal to a second size, which is different from the first size, the apparatus 20 may be caused to establish the actual size of said data based on the determined size of the field and the obtained value representing the length of said data packet. The second size may for example be larger than the first size.

In the previous described exemplary embodiment, the memory circuitry 1230 may store computer program code which, when run in the processing circuitry 1220, may cause the apparatus 20 to establish the actual size of said data packet by determine an offset value based on the determined size of the field and add the determined offset value to the obtained value representing the length of said data packet.

The apparatus 20 may for example be caused to determine the offset value to be equal to zero if the first bits of the field are not equal to zero. Else, if the first bits of the field are equal to zero, the offset value may be determined to be equal to a formula 2^(the second size of the field). The first bits are represented by a formula the second size minus the first size, wherein the first bits are the most significant bits. If the first size for example equals to 8 bits and the second size equals to 16 bits, the offset value may be equal to 65536.

According to another example, the apparatus 20 may be caused to determine the offset value to be equal to a formula 2^(the first size of the field). If the first size for example equals to 8 bits and the second size equals to 16 bits, the offset value may be equal to 256.

In one exemplary embodiment, the data packet may be a MAC SDU and the field may be an L-field. The L-field may be located in a header in a PDU carrying the MAC SDU. The memory circuitry 1230, within the apparatus 20, storing computer program code which, when run in the processing circuitry 1220, may cause the apparatus 20 to obtain the value representing a length of the MAC SDU, and to determine the size of the MAC SDU L-field. If the determined size of the MAC SDU L-field is equal to a first size, the apparatus 20 may be caused to establish the actual size of the MAC SDU to be the value assigned to the MAC SDU L-field. Else, if the determined size of the MAC SDU L-field is equal to a second size, which is different from the first size, the apparatus 20 may be caused to establish the actual size of the MAC SDU based on the determined size of the field and the obtained value representing the length of the data packet. The apparatus may further be caused to establish the actual size of the MAC SDU by determining an offset value based on the determined size of the MAC SDU L-field and then by adding the determined offset value to the obtained value representing the length of said MAC SDU.

In one exemplary embodiment, as illustrated in FIG. 12, the apparatus 20 further comprises a receiving circuitry 1210 and may be caused to receive the data packet, for example a MAC SDU.

According to a seventh aspect, the apparatus 20 comprises means adapted to handle a data packet, where a field is assigned a value representing a length of the data packet. The apparatus 20 may further comprise means adapted to obtain the value representing the length of the data packet and means adapted to determine a size of the field. The apparatus may further comprise means adapted to establish an actual size of the data packet based on the determined size of the field and the obtained value representing the length of the data packet.

Figure 13:
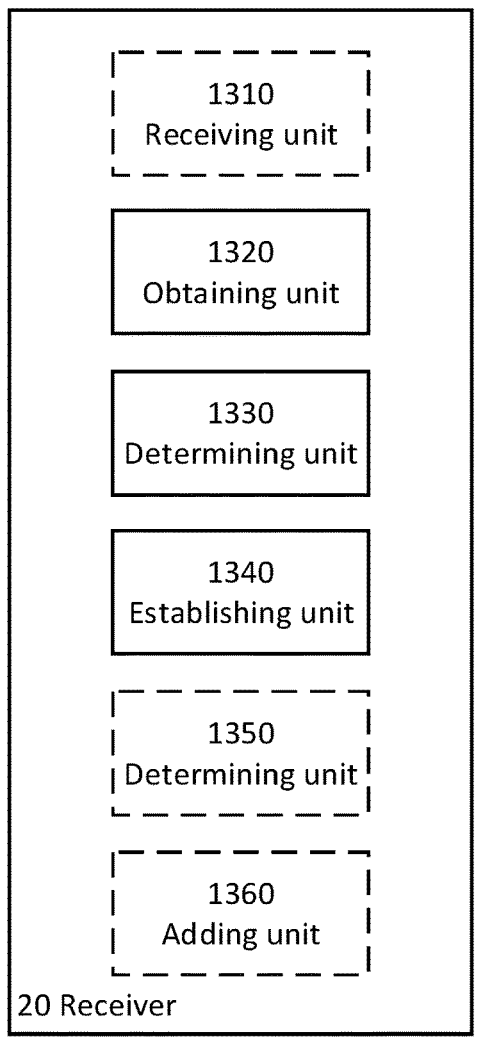
FIG. 13 shows a further example implementation of an apparatus.

According to an eight aspect, as illustrated in FIG. 13, the apparatus may comprise at least three modules. An obtaining unit 1320 is a first module of the apparatus 20 configured to obtain a value representing the length of a data packet. A determining unit 1330 is a second module of the apparatus 20 configured to determine a size of the field. A establishing unit 1340 is a third module of the apparatus 20 configured to establish an actual size of the data packet based on the determined size of the field and the obtained value representing the length of said data packet.

In one exemplary embodiment, the apparatus 20 may further comprise a receiving unit 1310 configured to receive the data packet.

In one exemplary embodiment, the apparatus 20 may further comprise a determining unit 1350 configured to determine an offset value based on the determined size of the field and the apparatus 20 may further comprise an adding unit 1360 configured to add the determined offset value to the obtained value representing the length of the data packet.

According to a ninth aspect, there is provided a computer program comprising instructions which, when executed on a processing circuitry, cause the processing circuitry to carry out the method according to the first aspect and/or the fifth aspect.

According to a tenth aspect, there is provided a carrier containing the computer program of the ninth aspect, wherein the carrier is one of an electronic signal, optical signal, radio signal, or computer readable storage medium.

Figure 14:
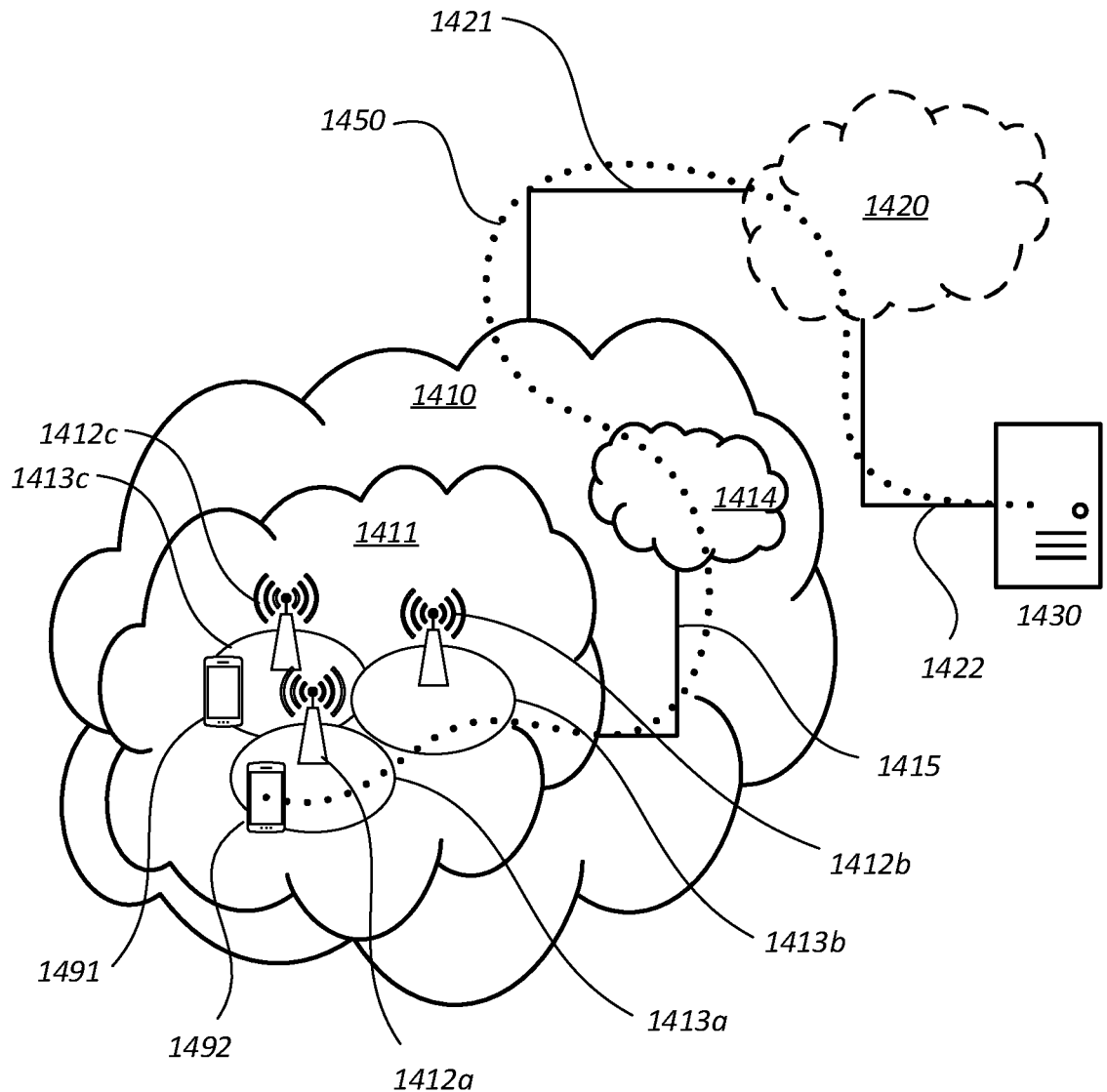
FIG. 14 schematically illustrates a telecommunication network connected via an intermediate network to a host computer.

With reference to FIG. 14, in accordance with an embodiment, a communication system includes a telecommunication network 1410, such as a 3GPP-type cellular network, which comprises an access network 1411, such as a radio access network, and a core network 1414. The access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to the core network 1414 over a wired or wireless connection 1415. A first user equipment (UE) 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

The telecommunication network 1410 is itself connected to a host computer 1430, which may be embodied in the hardware and/or software of a standalone server, a cloud-implemented server, a distributed server or as processing resources in a server farm. The host computer 1430 may be under the ownership or control of a service provider, or may be operated by the service provider or on behalf of the service provider. The connections 1421, 1422 between the telecommunication network 1410 and the host computer 1430 may extend directly from the core network 1414 to the host computer 1430 or may go via an optional intermediate network 3220. The intermediate network 3220 may be one of, or a combination of more than one of, a public, private or hosted network; the intermediate network 1420, if any, may be a backbone network or the Internet; in particular, the intermediate network 1420 may comprise two or more sub-networks (not shown).

The communication system of FIG. 14 as a whole enables connectivity between one of the connected UEs 1491, 1492 and the host computer 1430. The connectivity may be described as an over-the-top (OTT) connection 3250. The host computer 3230 and the connected UEs 1491, 1492 are configured to communicate data and/or signaling via the OTT connection 1450, using the access network 1411, the core network 1414, any intermediate network 1420 and possible further infrastructure (not shown) as intermediaries. The OTT connection 1450 may be transparent in the sense that the participating communication devices through which the OTT connection 1450 passes are unaware of routing of uplink and downlink communications. For example, a base station 1412 may not or need not be informed about the past routing of an incoming downlink communication with data originating from a host computer 1430 to be forwarded (e.g., handed over) to a connected UE 1491. Similarly, the base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In a communication system 1500, a host computer 1510 comprises hardware 1515 including a communication interface 1516 configured to set up and maintain a wired or wireless connection with an interface of a different communication device of the communication system 1500. The host computer 1510 further comprises processing circuitry 1518, which may have storage and/or processing capabilities. In particular, the processing circuitry 1518 may comprise one or more programmable processors, application-specific integrated circuits, field programmable gate arrays or combinations of these (not shown) adapted to execute instructions. The host computer 1510 further comprises software 1511, which is stored in or accessible by the host computer 1510 and executable by the processing circuitry 1518. The software 1511 includes a host application 1512. The host application 1512 may be operable to provide a service to a remote user, such as a UE 1530 connecting via an OTT connection 1550 terminating at the UE 1530 and the host computer 1510. In providing the service to the remote user, the host application 1512 may provide user data which is transmitted using the OTT connection 1550.

The communication system 1500 further includes a base station 1520 provided in a telecommunication system and comprising hardware 1525 enabling it to communicate with the host computer 1510 and with the UE 1530. The hardware 1525 may include a communication interface 1526 for setting up and maintaining a wired or wireless connection with an interface of a different communication device of the communication system 1500, as well as a radio interface 1527 for setting up and maintaining at least a wireless connection 1570 with a UE 1530 located in a coverage area (not shown in FIG. 15) served by the base station 1520. The communication interface 1526 may be configured to facilitate a connection 1560 to the host computer 1510. The connection 1560 may be direct or it may pass through a core network (not shown in FIG. 15) of the telecommunication system and/or through one or more intermediate networks outside the telecommunication system. In the embodiment shown, the hardware 1525 of the base station 1520 further includes processing circuitry 1528, which may comprise one or more programmable processors, application-specific integrated circuits, field programmable gate arrays or combinations of these (not shown) adapted to execute instructions. The base station 1520 further has software 1521 stored internally or accessible via an external connection.

The communication system 1500 further includes the UE 1530 already referred to. Its hardware 1535 may include a radio interface 1537 configured to set up and maintain a wireless connection 1570 with a base station serving a coverage area in which the UE 1530 is currently located. The hardware 1535 of the UE 1530 further includes processing circuitry 3338, which may comprise one or more programmable processors, application-specific integrated circuits, field programmable gate arrays or combinations of these (not shown) adapted to execute instructions. The UE 1530 further comprises software 1531, which is stored in or accessible by the UE 1530 and executable by the processing circuitry 1538. The software 1531 includes a client application 1532. The client application 1532 may be operable to provide a service to a human or non-human user via the UE 1530, with the support of the host computer 1510. In the host computer 1510, an executing host application 1512 may communicate with the executing client application 1532 via the OTT connection 1550 terminating at the UE 1530 and the host computer 1510. In providing the service to the user, the client application 1532 may receive request data from the host application 1512 and provide user data in response to the request data. The OTT connection 1550 may transfer both the request data and the user data. The client application 1532 may interact with the user to generate the user data that it provides.

Figure 15:
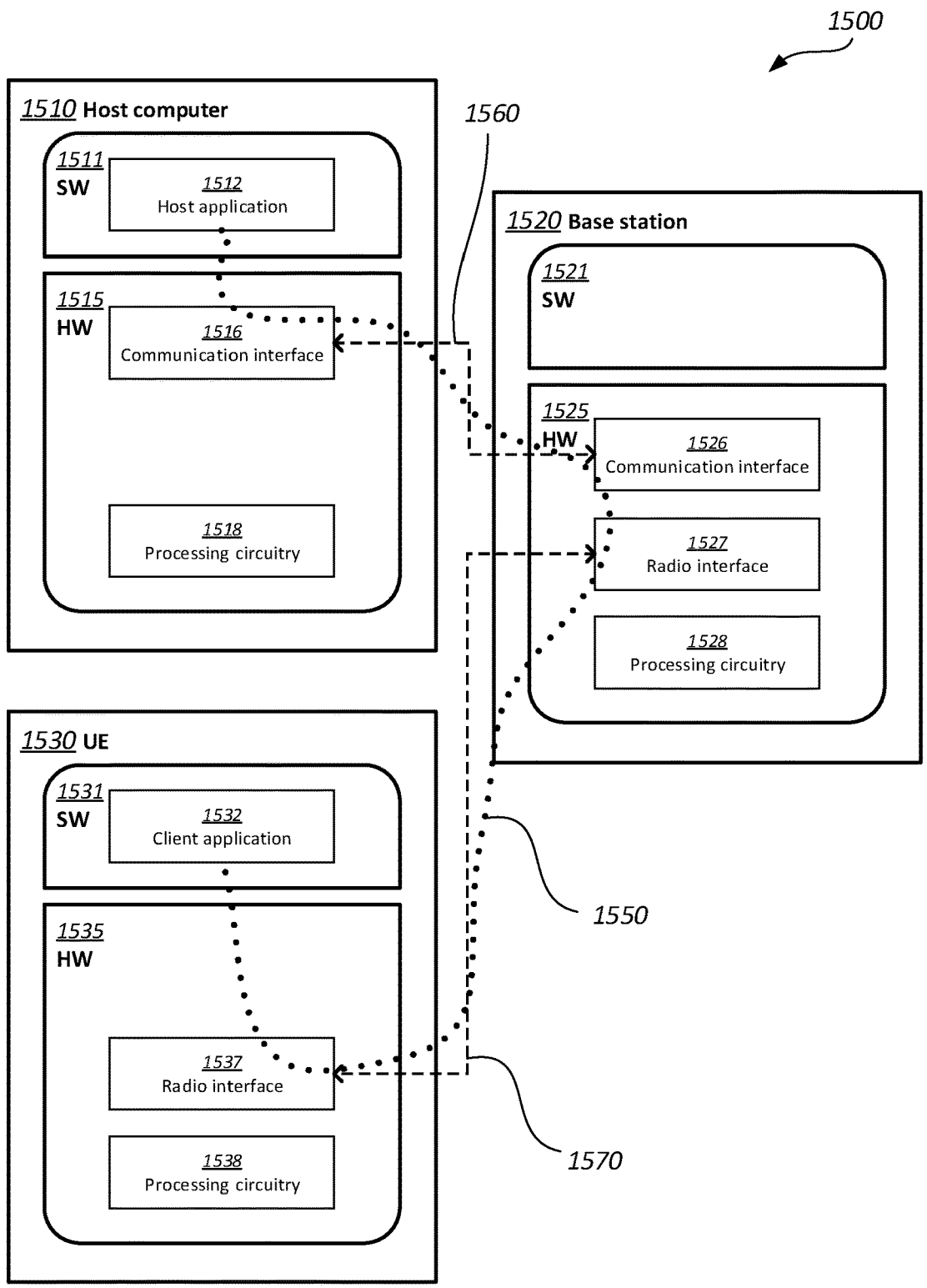
FIG. 15 is a generalized block diagram of a host computer communicating via a base station with a user equipment over a partially wireless connection.

It is noted that the host computer 1510, base station 1520 and UE 1530 illustrated in FIG. 15 may be identical to the host computer 1430, one of the base stations 1412*a*, 412*b*, 1412*c* and one of the UEs 1491, 1492 of FIG. 14, respectively. This is to say, the inner workings of these entities may be as shown in FIG. 15 and independently, the surrounding network topology may be that of FIG. 14.

In FIG. 15, the OTT connection 1550 has been drawn abstractly to illustrate the communication between the host computer 1510 and the user equipment 1530 via the base station 1520, without explicit reference to any intermediary devices and the precise routing of messages via these devices. Network infrastructure may determine the routing, which it may be configured to hide from the UE 1530 or from the service provider operating the host computer 1510, or both. While the OTT connection 1550 is active, the network infrastructure may further take decisions by which it dynamically changes the routing (e.g., on the basis of load balancing consideration or reconfiguration of the network).

The wireless connection 1570 between the UE 1530 and the base station 1520 is in accordance with the teachings of the embodiments described throughout this disclosure. One or more of the various embodiments improve the performance of OTT services provided to the UE 1530 using the OTT connection 1550, in which the wireless connection 1570 forms the last segment. More precisely, the teachings of these embodiments may improve the data rate and thereby provide benefits such as relaxed restriction on file size.

A measurement procedure may be provided for the purpose of monitoring data rate, latency and other factors on which the one or more embodiments improve. There may further be an optional network functionality for reconfiguring the OTT connection 1550 between the host computer 1510 and UE 1530, in response to variations in the measurement results. The measurement procedure and/or the network functionality for reconfiguring the OTT connection 1550 may be implemented in the software 1511 of the host computer 1510 or in the software 1531 of the UE 1530, or both. In embodiments, sensors (not shown) may be deployed in or in association with communication devices through which the OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of the OTT connection 1550 may include message format, retransmission settings, preferred routing etc.; the reconfiguring need not affect the base station 1520, and it may be unknown or imperceptible to the base station 1520. Such procedures and functionalities may be known and practiced in the art. In certain embodiments, measurements may involve proprietary UE signaling facilitating the host computer's 1510 measurements of throughput, propagation times, latency and the like. The measurements may be implemented in that the software 1511, 1531 causes messages to be transmitted, in particular empty or 'dummy' messages, using the OTT connection 1550 while it monitors propagation times, errors etc.

Figure 16:
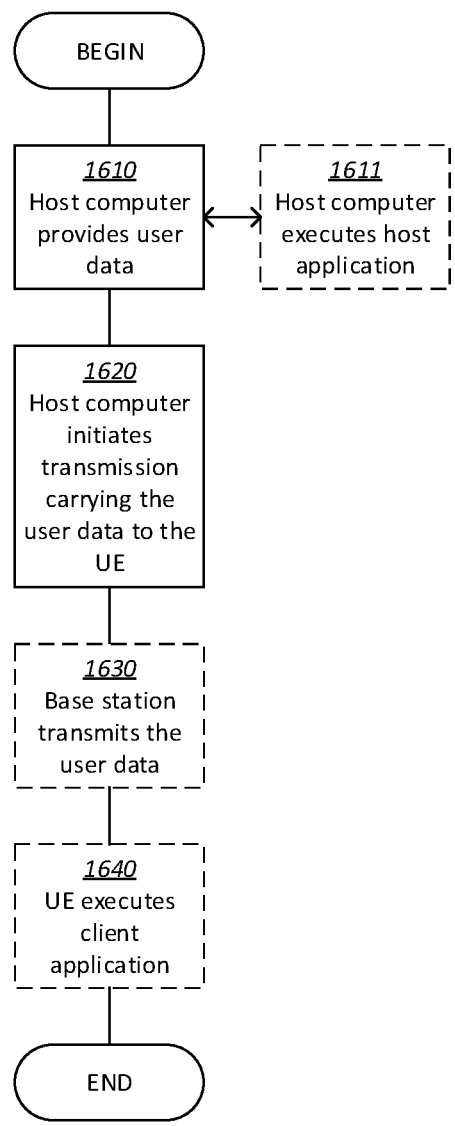

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In a first step 1610 of the method, the host computer provides user data. In an optional substep 1611 of the first step 1610, the host computer provides the user data by executing a host application. In a second step 1620, the host computer initiates a transmission carrying the user data to the UE. In an optional third step 1630, the base station transmits to the UE the user data which was carried in the transmission that the host computer initiated, in accordance with the teachings of the embodiments described throughout this disclosure. In an optional fourth step 1640, the UE executes a client application associated with the host application executed by the host computer.

Figure 17:
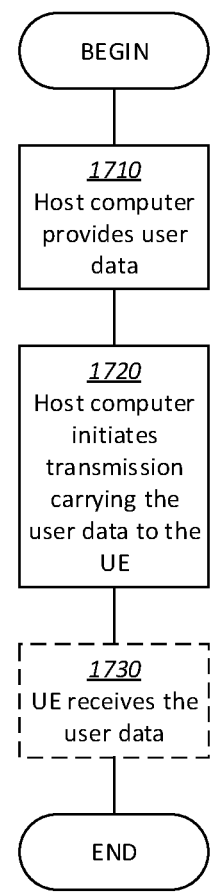

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In a first step 1710 of the method, the host computer provides user data. In an optional substep (not shown) the host computer provides the user data by executing a host application. In a second step 1720, the host computer initiates a transmission carrying the user data to the UE. The transmission may pass via the base station, in accordance with the teachings of the embodiments described throughout this disclosure. In an optional third step 1730, the UE receives the user data carried in the transmission.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In an optional first step 1810 of the method, the UE receives input data provided by the host computer. Additionally or alternatively, in an optional second step 1820, the UE provides user data. In an optional substep 1821 of the second step 1820, the UE provides the user data by executing a client application. In a further optional substep 1811 of the first step 1810, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1830, transmission of the user data to the host computer. In a fourth step 1840 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In an optional first step 1910 of the method, in accordance with the teachings of the embodiments described throughout this disclosure, the base station receives user data from the UE. In an optional second step 1920, the base station initiates transmission of the received user data to the host computer. In a third step 1930, the host computer receives the user data carried in the transmission initiated by the base station.

Numbered Embodiments in Particular Related to FIGS. 14-19

1. A base station configured to communicate with a user equipment (UE), the base station comprising a radio interface and processing circuitry configured to assign a value representing a length of a data packet to a field, wherein the base station further is configured to:
   determine a size of the data packet;
   set a size of the field based on the determined size of the data packet;
   compare the determined size of the data packet against a value threshold;
   calculate a value representing the length of the data packet based on the determined size of the data packet; and
   assign the calculated value representing the length of the data packet to the field.

2. The base station of embodiment 1, further configured to set the size of the field by:
   if the determined size of the data packet is below or equal to a field threshold:
      set the size of the field to a first size; else
   if the determined size of the data packet is above said field threshold:
      set the size of the field to a second size which is different from the first size.

3. The base station of embodiment 1 or 2, further configured to:
   if the determined size of the data packet is below or equal to a first value threshold:
      calculate the value representing the length of the data packet to be an actual value of the determined size of the data packet; and
      assign the calculated value representing the length of the data packet to the field, else
   if the determined size of the data packet is above said first value threshold:
      calculate the value representing the length of the data packet based on the determined size of the data packet; and
      assign the calculated value to the field.

4. The base station of embodiment 3, further configured to calculate the value representing the length of the data packet by:
   determine an offset value based on the determined size of the data packet; and
   subtract the offset value from an actual value of said determined size of the data packet.

5. The base station of embodiment 4, wherein the first value threshold is equal to a formula 2^(the first size of the field)−1 and the offset value is equal to a formula 2^(the first size of the field).

6. The base station of embodiment 4, wherein the first value threshold is equal to a formula 2^(the second size of the field)−1 and the offset value is equal to a formula 2^(the second size of the field).

7. The base station of any of embodiments 3 to 6, wherein the determined size of the data packet is above a second value threshold which is larger than the first value threshold, and wherein the base station further is configured to:
   if the determined size of the data packet is below or equal to a third value threshold:
      calculate the value representing the length of the data packet to be an actual value of the determined size of the data packet; and
      assign the calculated value representing the length of the data packet to the field, else
   if the determined size of the data packet is above said third value threshold:
      calculate the value representing the length of the data packet based on the determined size of the data packet; and
      assign the calculated value to the field.

8. The base station of any of embodiments 1 to 7, wherein the data packet is a Media Access Control, MAC, Service Data Unit, SDU and wherein the field is an L-field.

9. The base station of embodiment 8, wherein the L-field is located in a header in a Protocol Data Unit, PDU, carrying the MAC SDU.

10. The base station of embodiment 8 or 9, configured to determine the size of the MAC SDU;
    set the size of the MAC SDU L-field based on the determined size of the MAC SDU; and if the determined size of the MAC SDU is below or equal
to said first value threshold:
calculate the value representing the length of the MAC
SDU to be the actual value of the determined size of
the MAC SDU; and
assign the calculated value to the MAC SDU L-field;
else
if the determined size of the MAC SDU is above said first
value threshold:
calculate the value representing the length of the MAC
SDU by determining the offset value based on the
determined size of the MAC SDU and subtracting
the offset value from an actual value of said determined size of the MAC SDU; and
assign the calculated value to the MAC SDU L-field.

11. The base station of any of embodiments 1 to 10, wherein the base station is configured to transmit the data packet to a receiving apparatus.

12. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to assign a value representing a length of a data packet to a field and configured to:
determine a size of the data packet;
set a size of the field based on the determined size of the data packet;
compare the determined size of the data packet against a value threshold;
calculate a value representing the length of the data packet based on the determined size of the data packet; and
assign the calculated value representing the length of the data packet to the field.

13. The communication system of embodiment 12, further including the base station.

14. The communication system of embodiment 13, further including the UE, wherein the UE is configured to communicate with the base station.

15. The communication system of embodiment 14, wherein:
the processing circuitry of the host computer is configured to execute a host application, thereby providing the user data; and
the UE comprises processing circuitry configured to execute a client application associated with the host application.

16. A method implemented in a base station for assigning a value representing a length of a data packet to a field, the method comprising:
determining a size of the data packet;
setting a size of the field based on the determined size of the data packet;
comparing the determined size of the data packet against a value threshold;
calculating a value representing the length of the data packet based on said comparison and based on the determined size of the data packet; and
assigning the calculated value representing the length of the data packet to the field.

17. The method of embodiment 16, wherein setting the size of the field comprises:
if the determined size of the data packet is below or equal to a field threshold:
setting the size of the field to a first size; else
if the determined size of the data packet is above said field threshold:
setting the size of the field to a second size which is different from the first size.

18. The method of embodiment 16 or 17, wherein
if the determined size of the data packet is below or equal to a first value threshold:
calculating the value representing the length of the data packet to be an actual value of the determined size of the data packet; and
assigning the calculated value representing the length of the data packet to the field, else
if the determined size of the data packet is above said first value threshold:
calculating the value representing the length of the data packet based on the determined size of the data packet; and
assigning the calculated value to the field.

19. The method of embodiment 18, wherein calculating the value representing the length of the data packet comprises:
determining an offset value based on the determined size of the data packet; and
subtracting the offset value from an actual value of said determined size of the data packet.

20. The method of embodiment 19, wherein the first value threshold is equal to a formula 2^(the first size of the field)−1 and the offset value is equal to a formula 2^(the first size of the field).

21. The method of embodiment 19, wherein the first value threshold is equal to a formula 2^(the second size of the field)−1 and the offset value is equal to a formula 2^(the second size of the field).

22. The method of any of embodiments 18 to 21, wherein the determined size of the data packet is above a second value threshold which is larger than the first value threshold, and wherein
if the determined size of the data packet is below or equal to a third value threshold:
calculating the value representing the length of the data packet to be an actual value of the determined size of the data packet; and
assigning the calculated value representing the length of the data packet to the field, else
if the determined size of the data packet is above said third value threshold:
calculating the value representing the length of the data packet based on the determined size of the data packet; and
assigning the calculated value to the field.

23. The method of any of embodiments 16 to 22, wherein the data packet is a Media Access Control, MAC, Service Data Unit, SDU and wherein the field is an L-field.

24. The method of embodiment 23, wherein the L-field is located in a header in a Protocol Data Unit, PDU, carrying the MAC SDU.

25. The method of any of embodiments 23 or 24, wherein the method comprises:
determining the size of the MAC SDU;
setting the size of the MAC SDU L-field based on the determined size of the MAC SDU; and if the determined size of the MAC SDU is below or equal to said first value threshold:
  calculating the value representing the length of the MAC SDU to be the actual value of the determined size of the MAC SDU; and
  assigning the calculated value to the MAC SDU L-field; else
if the determined size of the MAC SDU is above said first value threshold:
  calculating the value representing the length of the MAC SDU by:
    determining the offset value based on the determined size of the MAC SDU; and
    subtracting the offset value from the actual value of said determined size of the MAC SDU; and
    assigning the calculated value to the MAC SDU L-field.

26. The method of any of embodiments 16 to 25, wherein the method further comprises:
  transmitting the data packet to a receiving apparatus.

27. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station assign a value representing a length of a data packet to a field by:
    determining a size of the data packet;
    setting a size of the field based on the determined size of the data packet;
    comparing the determined size of the data packet against a value threshold;
    calculating a value representing the length of the data packet based on said comparison and based on the determined size of the data packet; and
    assigning the calculated value representing the length of the data packet to the field.

28. The method of embodiment 27, further comprising:
  at the base station, transmitting the user data.

29. The method of embodiment 28, wherein the user data is provided at the host computer by executing a host application, the method further comprising:
  at the UE, executing a client application associated with the host application.

30. A user equipment (UE) configured to communicate with a base station, the UE comprising a radio interface and processing circuitry configured to handle a data packet, wherein a field is assigned a value representing a length of said data packet and configured to:
  obtain the value representing the length of said data packet;
  determine a size of the field; and
  establish an actual size of said data packet based on the determined size of the field and the obtained value representing the length of said data packet.

31. The user equipment (UE) of embodiment 30, wherein the UE is configured to:
  if the determined size of the field is equal to a first size:
    establish the actual size of the data packet to be the value assigned to the field; else
  if the determined size of the field is equal to a second size, which is different from the first size:
    establish the actual size of said data based on the determined size of the field and the obtained value representing the length of said data packet.

32. The UE of embodiment 31, wherein the determined offset value is equal to a formula 2^(the first size of the field).

33. The UE of embodiment 31, wherein the UE is configured to determine the offset value by:
  if the first bits of the field are not equal to zero, wherein the first bits are represented by a formula the second size minus the first size:
    the determined offset value is equal to zero, else
  if the first bits of the field are equal to zero:
    the determined offset value is equal to a formula 2^(the second size of the field).

34. The UE of any embodiments 30 to 33, wherein the data packet is a Media Access Control, MAC, Service Data Unit, SDU and wherein the field is an L-field.

35. The UE of embodiment 34, wherein the L-field is located in a header in a Protocol Data Unit, PDU, carrying the MAC SDU.

36. The UE of any of embodiments 34 or 35, wherein the UE is configured to:
  obtain the value representing a length of the MAC SDU;
  determine the size of the MAC SDU L-field; and
  if the determined size of the MAC SDU L-field is equal to a first size:
    establish the actual size of the MAC SDU to be the value assigned to the MAC SDU L-field; else
  if the determined size of the MAC SDU L-field is equal to a second size, which is different from the first size:
    establish the actual size of the MAC SDU by determine the offset value based on the determined size of the MAC SDU L-field and add the determined offset value to the obtained value representing the length of said MAC SDU.

37. The UE of any of embodiments 30 to 36, wherein the UE is configured to:
  receive the data packet.

38. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's processing circuitry configured to handle a data packet, wherein a field is assigned a value representing a length of said data packet and configured to:
    obtain the value representing the length of said data packet;
    determine a size of the field; and
    establish an actual size of said data packet based on the determined size of the field and the obtained value representing the length of said data packet.

39. The communication system of embodiment 38, further including the UE.

40. The communication system of embodiment 39, wherein the cellular network further includes a base station configured to communicate with the UE.

41. The communication system of embodiment 39 or 40, wherein:
  the processing circuitry of the host computer is configured to execute a host application, thereby providing the user data; and
  the UE's processing circuitry is configured to execute a client application associated with the host application.

42. A method implemented in a user equipment (UE), for handling a data packet, wherein a field is assigned a value representing a length of said data packet, the method comprising:
obtaining the value representing the length of said data packet;
determining a size of the field; and
establishing an actual size of said data packet based on the determined size of the field and the obtained value representing the length of said data packet.

43. The method of embodiment 42, wherein:
if the determined size of the field is equal to a first size:
establishing the actual size of the data packet to be the value assigned to the field; else
if the determined size of the field is equal to a second size, which is different from the first size:
establishing the actual size of said data packet based on the determined size of the field and the obtained value representing the length of said data packet.

44. The method of embodiment 43, wherein establishing the actual size of said data packet comprising:
determining an offset value based on the determined size of the field; and
adding the determined offset value to the obtained value representing the length of said data packet.

45. The method of embodiment 44, wherein the determined offset value is equal to a formula $2^{\wedge}$(the first size of the field).

46. The method of embodiment 44, wherein determining the offset value comprises:
if the first bits of the field are not equal to zero, wherein the first bits are represented by a formula the second size minus the first size:
the determined offset value is equal to zero, else
if the first bits of the field are equal to zero:
the determined offset value is equal to a formula $2^{\wedge}$(the second size of the field).

47. The method of any of embodiments 42 to 46, wherein the data packet is a Media Access Control, MAC, Service Data Unit, SDU and wherein the field is an L-field.

48. The method of embodiment 47, wherein the L-field is located in a header in a Protocol Data Unit, PDU, carrying the MAC SDU.

49. The method of any of embodiments 47 or 48, wherein the method comprises:
obtaining the value representing a length of the MAC SDU;
determining the size of the MAC SDU L-field; and
if the determined size of the MAC SDU L-field is equal to a first size:
establishing the actual size of the MAC SDU to be the value assigned to the MAC SDU L-field; else
if the determined size of the MAC SDU L-field is equal to a second size, which is different from the first size:
establishing the actual size of the MAC SDU by determining the offset value based on the determined size of the MAC SDU L-field and adding the determined offset value to the obtained value representing the length of said MAC SDU.

50. The method of any of embodiments 42 to 49, wherein the method further comprises:
receiving the data packet.

51. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE handling a data packet, wherein a field is assigned a value representing a length of said data packet, and wherein the UE:
obtaining value representing the length of said data packet;
determining a size of the field; and
establishing an actual size of said data packet based on the determined size of the field and the obtained value representing the length of said data packet.

52. The method of embodiment 51, further comprising:
at the UE, receiving the user data from the base station.

53. A user equipment (UE) configured to communicate with a base station, the UE comprising a radio interface and processing circuitry configured to assign a value representing a length of a data packet to a field, wherein the processing circuitry further is configured to:
determine a size of the data packet;
set a size of the field based on the determined size of the data packet;
compare the determined size of the data packet against a value threshold;
calculate a value representing the length of the data packet based on the determined size of the data packet; and
assign the calculated value representing the length of the data packet to the field.

54. The UE of embodiment 53, further configured to set the size of the field by:
if the determined size of the data packet is below or equal to a field threshold:
set the size of the field to a first size; else
if the determined size of the data packet is above said field threshold:
set the size of the field to a second size which is different from the first size.

55. The UE of embodiment 53 or 54, further configured to:
if the determined size of the data packet is below or equal to a first value threshold:
calculate the value representing the length of the data packet to be an actual value of the determined size of the data packet; and
assign the calculated value representing the length of the data packet to the field, else
if the determined size of the data packet is above said first value threshold:
calculate the value representing the length of the data packet based on the determined size of the data packet; and
assign the calculated value to the field.

56. The UE of embodiment 55, further configured to calculate the value representing the length of the data packet by:
determine an offset value based on the determined size of the data packet; and
subtract the offset value from an actual value of said determined size of the data packet.

57. The UE of embodiment 56, wherein the first value threshold is equal to a formula $2^{\wedge}$(the first size of the field)$-1$ and the offset value is equal to a formula $2^{\wedge}$(the first size of the field).

58. The UE of embodiment 56, wherein the first value threshold is equal to a formula $2^{\wedge}$(the second size of the field)$-1$ and the offset value is equal to a formula $2^{\wedge}$(the second size of the field).

59. The UE of any of embodiments 55 to 58, wherein the determined size of the data packet is above a second value threshold which is larger than the first value threshold, and wherein the base station further is configured to:
if the determined size of the data packet is below or equal to a third value threshold:
calculate the value representing the length of the data packet to be an actual value of the determined size of the data packet; and
assign the calculated value representing the length of the data packet to the field, else
if the determined size of the data packet is above said third value threshold:
calculate the value representing the length of the data packet based on the determined size of the data packet; and
assign the calculated value to the field.

60. The UE of any of embodiment 53 to 59, wherein the data packet is a Media Access Control, MAC, Service Data Unit, SDU and wherein the field is an L-field.

61. The UE of embodiment 60, wherein the L-field is located in a header in a Protocol Data Unit, PDU, carrying the MAC SDU.

62. The UE of any of embodiment 60 or 61, configured to determine the size of the MAC SDU;
set the size of the MAC SDU L-field based on the determined size of the MAC SDU; and
if the determined size of the MAC SDU is below or equal to said first value threshold:
calculate the value representing the length of the MAC SDU to be the actual value of the determined size of the MAC SDU; and
assign the calculated value to the MAC SDU L-field; else
if the determined size of the MAC SDU is above said first value threshold:
calculate the value representing the length of the MAC SDU by determining the offset value based on the determined size of the MAC SDU and subtracting the offset value from an actual value of said determined size of the MAC SDU; and
assign the calculated value to the MAC SDU L-field.

63. The UE of any of embodiments 53 to 62, wherein the UE is configured to transmit the data packet to a receiving apparatus.

64. A communication system including a host computer comprising:
a communication interface configured to receive user data originating from a transmission from a user equipment (UE) to a base station,
wherein the UE comprises a radio interface and processing circuitry, the UE's processing circuitry configured to assign a value representing a length of a data packet to a field and configured to:
determine a size of the data packet;
set a size of the field based on the determined size of the data packet;
compare the determined size of the data packet against a value threshold;
calculate a value representing the length of the data packet based on the determined size of the data packet; and
assign the calculated value representing the length of the data packet to the field.

65. The communication system of embodiment 64, further including the UE.

66. The communication system of embodiment 65, further including the base station, wherein the base station comprises a radio interface configured to communicate with the UE and a communication interface configured to forward to the host computer the user data carried by a transmission from the UE to the base station.

67. The communication system of embodiment 65 or 66, wherein:
the processing circuitry of the host computer is configured to execute a host application; and
the UE's processing circuitry is configured to execute a client application associated with the host application, thereby providing the user data.

68. The communication system of embodiment 65 or 66, wherein:
the processing circuitry of the host computer is configured to execute a host application, thereby providing request data; and
the UE's processing circuitry is configured to execute a client application associated with the host application, thereby providing the user data in response to the request data.

69. A method implemented in a user equipment (UE), for assigning a value representing a length of a data packet to a field, the method comprising:
determining a size of the data packet;
setting a size of the field based on the determined size of the data packet;
comparing the determined size of the data packet against a value threshold;
calculating a value representing the length of the data packet based on said comparison and based on the determined size of the data packet; and
assigning the calculated value representing the length of the data packet to the field.

70. The method of embodiment 69, further comprising:
providing user data; and
forwarding the user data to a host computer via the transmission to the base station.

71. A method implemented in a communication system including a host computer, a base station and a user equipment (UE), the method comprising:
at the host computer, receiving user data transmitted to the base station from the UE, wherein the UE assigning a value representing a length of a data packet to a field, by:
determining a size of the data packet;
setting a size of the field based on the determined size of the data packet;
comparing the determined size of the data packet against a value threshold;
calculating a value representing the length of the data packet based on said comparison and based on the determined size of the data packet; and
assigning the calculated value representing the length of the data packet to the field.

72. The method of embodiment 71, further comprising:
at the UE, providing the user data to the base station.

73. The method of embodiment 72, further comprising:
at the UE, executing a client application, thereby providing the user data to be transmitted; and
at the host computer, executing a host application associated with the client application.

74. The method of embodiment 72, further comprising:
at the UE, executing a client application; and at the UE, receiving input data to the client application, the input data being provided at the host computer by executing a host application associated with the client application, wherein the user data to be transmitted is provided by the client application in response to the input data.

75. A base station configured to communicate with a user equipment (UE), the base station comprising a radio interface and processing circuitry configured to handle a data packet, wherein a field is assigned a value representing a length of said data packet, and configured to:
obtain the value representing the length of said data packet;
determine a size of the field; and
establish an actual size of said data packet based on the determined size of the field and the obtained value representing the length of said data packet.

76. The base station of embodiment 75, wherein the base station is configured to:
if the determined size of the field is equal to a first size:
establish the actual size of the data packet to be the value assigned to the field; else
if the determined size of the field is equal to a second size, which is different from the first size:
establish the actual size of said data based on the determined size of the field and the obtained value representing the length of said data packet.

77. The base station of embodiment 76, wherein the determined offset value is equal to a formula 2^(the first size of the field).

78. The base station of embodiment 76, wherein the base station is configured to determine the offset value by:
if the first bits of the field are not equal to zero, wherein the first bits are represented by a formula the second size minus the first size:
the determined offset value is equal to zero, else
if the first bits of the field are equal to zero:
the determined offset value is equal to a formula 2^(the second size of the field).

79. The base station of any of embodiments 75 to 78, wherein the data packet is a Media Access Control, MAC, Service Data Unit, SDU and wherein the field is an L-field.

80. The base station of embodiment 79, wherein the L-field is located in a header in a Protocol Data Unit, PDU, carrying the MAC SDU.

81. The base station of any of embodiments 79 or 80, wherein the base station is configured to:
obtain the value representing a length of the MAC SDU;
determine the size of the MAC SDU L-field; and
if the determined size of the MAC SDU L-field is equal to a first size:
establish the actual size of the MAC SDU to be the value assigned to the MAC SDU L-field; else
if the determined size of the MAC SDU L-field is equal to a second size, which is different from the first size:
establish the actual size of the MAC SDU by determine the offset value based on the determined size of the MAC SDU L-field and add the determined offset value to the obtained value representing the length of said MAC SDU.

82. The base station of any of embodiments 75 to 81, wherein the base station is configured to:
receive the data packet.

83. A communication system including a host computer comprising a communication interface configured to receive user data originating from a transmission from a user equipment (UE) to a base station, wherein the base station comprises a radio interface and processing circuitry, the base station's processing circuitry configured to handle a data packet, wherein a field is assigned a value representing a length of said data packet and configured to:
obtain the value representing the length of said data packet;
determine a size of the field; and
establish an actual size of said data packet based on the determined size of the field and the obtained value representing the length of said data packet.

84. The communication system of embodiment 83, further including the base station.

85. The communication system of embodiment 84, further including the UE, wherein the UE is configured to communicate with the base station.

86. The communication system of embodiment 85, wherein:
the processing circuitry of the host computer is configured to execute a host application;
the UE is configured to execute a client application associated with the host application, thereby providing the user data to be received by the host computer.

87. A method implemented in a base station, for handling a data packet, wherein a field is assigned a value representing a length of said data packet, the method comprising:
obtaining the value representing the length of said data packet;
determining a size of the field; and
establishing an actual size of said data packet based on the determined size of the field and the obtained value representing the length of said data packet.

88. The method of embodiment 87, wherein:
if the determined size of the field is equal to a first size:
establishing the actual size of the data packet to be the value assigned to the field; else
if the determined size of the field is equal to a second size, which is different from the first size:
establishing the actual size of said data packet based on the determined size of the field and the obtained value representing the length of said data packet.

89. The method of embodiment 88, wherein establishing the actual size of said data packet comprising:
determining an offset value based on the determined size of the field; and
adding the determined offset value to the obtained value representing the length of said data packet.

90. The method of embodiment 89, wherein the determined offset value is equal to a formula 2^(the first size of the field).

91. The method of embodiment 89, wherein determining the offset value comprises:
if the first bits of the field are not equal to zero, wherein the first bits are represented by a formula the second size minus the first size:
the determined offset value is equal to zero, else
if the first bits of the field are equal to zero:
the determined offset value is equal to a formula 2^(the second size of the field).

92. The method of any of embodiments 87 to 91, wherein the data packet is a Media Access Control, MAC, Service Data Unit, SDU and wherein the field is an L-field.

93. The method of embodiment 92, wherein the L-field is located in a header in a Protocol Data Unit, PDU, carrying the MAC SDU.

94. The method of any of embodiments 92 or 93, wherein the method comprises:
obtaining the value representing a length of the MAC SDU;
determining the size of the MAC SDU L-field; and
if the determined size of the MAC SDU L-field is equal to a first size:
establishing the actual size of the MAC SDU to be the value assigned to the MAC SDU L-field; else
if the determined size of the MAC SDU L-field is equal to a second size, which is different from the first size:
establishing the actual size of the MAC SDU by determining the offset value based on the determined size of the MAC SDU L-field and adding the determined offset value to the obtained value representing the length of said MAC SDU.

95. The method of any of embodiments 87 to 94, wherein the method further comprises:
receiving the data packet.

96. A method implemented in a communication system including a host computer, a base station and a user equipment (UE), for handling a data packet, wherein a field is assigned a value representing a length of said data packet, the method comprising:
at the host computer, receiving, from the base station, user data originating from a transmission which the base station has received from the UE, wherein the UE obtaining the value representing the length of said data packet;
determining a size of the field; and
establishing an actual size of said data packet based on the determined size of the field and the obtained value representing the length of said data packet.

97. The method of embodiment 96, further comprising:
at the base station, receiving the user data from the UE.

98. The method of embodiment 97, further comprising:
at the base station, initiating a transmission of the received user data to the host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method for assigning a value representing an actual length of a data packet to a length field, the method comprising:
determining the actual length (L) of the data packet, wherein the actual length (L) of the data packet is greater than a certain length;
setting a length of the length field based on the determined actual length of the data packet;
determining an offset value (O) based on i) the actual length of the data packet or ii) the set length of the length field;
using L, determining a length value (LV) for representing the actual length of the data packet, wherein: $LV=L-O$, where O is the determined offset value; and
assigning to the length field the determined length value (LV) representing the actual length of the data packet.

2. The method according to claim 1, wherein
the offset value (O) is determined based on the determined actual length (L) of the data packet, and
determining the offset value (O) based on the determined actual length (L) of the data packet comprises:
determining whether L satisfies a certain condition, wherein determining whether L satisfies the certain condition comprises determining whether L is greater than a first threshold value; and
as a result of determining that L satisfies the certain condition, setting O equal to v1, where v1 is an integer greater than zero.

3. The method according to claim 1, wherein
the data packet is a Media Access Control Service Data Unit (MAC SDU), and
the length field is located in a header in a Protocol Data Unit (PDU) carrying the MAC SDU.

4. The method according to claim 1, wherein the method further comprises:
after assigning to the length field the determined length value (LV), transmitting to a receiving apparatus a protocol data unit (PDU) comprising a header containing the length field and a payload comprising the data packet.

5. An apparatus, comprising:
a processing circuitry; and
a memory circuitry storing computer program code which, when run in the processing circuitry, causes the apparatus to:
determine an actual length of a data packet;
set a length of a length field based on the determined actual length of the data packet; and
if the determined actual length of the data packet is greater than a threshold, then further causes the apparatus to:
determine a length value (LV) for representing the actual length of the data packet, wherein: $LV=L-O$, where L is the determined actual length of the data packet and O is an offset value greater than 0; and assigning to the length field the determined length value (LV) representing the actual length of the data packet.

6. The apparatus according to claim 5, wherein the apparatus is configured to determine the offset value (O) based on the set length of the length field.

7. The apparatus according to claim 5, wherein the threshold is a function of LF, wherein LF is the length to which the length field was set.

8. The apparatus according to claim 7, wherein the threshold is equal to $2^{LF}-1$.

9. The apparatus according to claim 5, wherein the data packet is a Media Access Control Service Data Unit (MAC SDU), and the length field is located in a header in a Protocol Data Unit (PDU) for carrying the MAC SDU.

10. The apparatus according to claim 5, wherein the apparatus further comprises a transmitting circuitry, and wherein the memory circuitry storing computer program code which, when run in the processing circuitry, causes the apparatus to:
transmit to a receiving apparatus a protocol data unit (PUD) comprising a header containing the length field and a payload comprising the data packet.

11. The apparatus according to claim 5, wherein the apparatus is a transmitter.

12. A method for handling a data packet, wherein a length field for the data packet contains a length value representing an actual length of said data packet, the length field having a length, the method comprising:
determining the length of the length field;
obtaining from the length field the length value (LV) representing the actual length (L) of the data packet, wherein LV=L−O, where O is a determined offset value;
determining the actual length of the data packet based on the determined length of the length field and LV.

13. The method according to claim 12, wherein the data packet is a Media Access Control Service Data Unit (MAC SDU), and the length field is located in a header in a Protocol Data Unit (PDU) carrying the MAC SDU.

14. The method according to claim 12, wherein the method further comprises:
receiving a protocol data unit comprising a header comprising the length field and a payload comprising the data packet.

15. An apparatus, comprising:
a processing circuitry; and
a memory circuitry storing computer program code which, when run in the processing circuitry, causes the apparatus to
determine a length of a length field containing a length value (LV) representing the actual length (L) of a data packet, wherein LV=L−O, where O is a determined offset value;
obtain the LV from the length field; and
determine the actual length of the data packet based on the determined length of the length field and LV.

16. The apparatus according to claim 15, wherein the apparatus is configured to determine the actual length of the data packet based on the determined length of the length field (LF) and LV by:
determining the offset value (O) based on the LF and/or LV; and
if the determined offset value is greater than 0, calculate LV+O.

17. The apparatus according to claim 16, wherein the determined offset value is equal to: $2^{LF}$ or $(2^{(LF-x)}+c)$, where LF is the determined length of the length field, x is greater than 0 but less than LF, and c is greater than or equal to 0.

18. The apparatus according to claim 16, wherein determining the offset value based on LF and/or LV comprises:
determining whether LV is less than $2^{(LF-x)}$, where x is greater than 0 but less than LF; and
as a result of determining that LV is less than $2^{(LF-x)}$, determining O to be equal to $2^{(LF)}$.

19. The apparatus according to claim 15, wherein the data packet is a Media Access Control Service Data Unit (MAC SDU), and the length field is located in a header in a Protocol Data Unit (PDU) carrying the MAC SDU.

20. The apparatus according to claim 15, wherein the apparatus further comprises a receiving circuitry and wherein the memory circuitry storing computer program code which, when run in the processing circuitry, causes the apparatus to:
receive a protocol data unit comprising a header comprising the length field and a payload comprising the data packet.

* * * * *